US010750569B2

(12) United States Patent
Nagaraja et al.

(10) Patent No.: US 10,750,569 B2
(45) Date of Patent: Aug. 18, 2020

(54) BEAM MANAGEMENT FOR CONNECTED MODE DISCONTINUOUS RECEPTION OPERATION

(71) Applicant: QUALCOMM Incorporated, San Diego, CA (US)

(72) Inventors: Sumeeth Nagaraja, San Diego, CA (US); Tao Luo, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/909,782

(22) Filed: Mar. 1, 2018

(65) Prior Publication Data

US 2018/0255607 A1    Sep. 6, 2018

Related U.S. Application Data

(60) Provisional application No. 62/467,046, filed on Mar. 3, 2017.

(51) Int. Cl.
*H04W 76/28*    (2018.01)
*H04W 52/02*    (2009.01)
(Continued)

(52) U.S. Cl.
CPC .......... *H04W 76/28* (2018.02); *H04B 7/0695* (2013.01); *H04L 5/0051* (2013.01);
(Continued)

(58) Field of Classification Search
CPC . H04W 76/28; H04W 52/0216; H04W 16/28; H04W 52/0229; H04B 7/0695; H04L 5/0051; H04L 5/0053; H04L 5/0091
See application file for complete search history.

(56) References Cited

U.S. PATENT DOCUMENTS 8,121,045 B2    2/2012    Cai et al.
9,433,002 B2    8/2016    Yu et al.
(Continued)

FOREIGN PATENT DOCUMENTS

WO    WO-2017146535 A1    8/2017

OTHER PUBLICATIONS

Interdigital Communications: "C-DRX Beam Management Aspects", 3GPP Draft; R2-1701187 (NR SI Al10214) C-DRX Beam Management Aspects, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 12, 2017 (Feb. 12, 2017), pp. 1-3, XP051211879, Retrieved from the Internet: URL: http://www.3gpp.org/ftp/Meetings_3GPP_SYNC/RAN2/Docsi [retrieved on Feb. 12, 2017].

(Continued)

*Primary Examiner* — Kabir A Timory
(74) *Attorney, Agent, or Firm* — Holland & Hart LLP/Qualcomm

(57) ABSTRACT

Methods, systems, and devices for wireless communication are described. A base station may transmit a UE-specific beam management parameter to a user equipment (UE) in a connected mode discontinuous reception (C-DRX) OFF state. The UE-specific beam management parameter may indicate a time interval for reception of downlink reference signals (RSs) prior to the beginning of a next C-DRX ON state. The UE may monitor for downlink RSs, and transmit an uplink measurement report during the C-DRX OFF state, which may indicate a reconfigured active beam pair for use during the next C-DRX ON duration. In some cases, the UE may transmit uplink RSs to the base station, and the base station may reconfigure an active beam pair based on the uplink RSs. The UE may monitor for control information (Continued)

(e.g., in a physical downlink control channel (PDCCH)) during the next C-DRX ON duration, using the reconfigured active beam pair.

25 Claims, 16 Drawing Sheets

(51) Int. Cl.
    *H04W 16/28*     (2009.01)
    *H04B 7/06*     (2006.01)
    *H04L 5/00*     (2006.01)
    *H04W 24/10*     (2009.01)
    *H04L 27/00*     (2006.01)

(52) U.S. Cl.
    CPC .......... *H04L 5/0053* (2013.01); *H04L 5/0091* (2013.01); *H04W 16/28* (2013.01); *H04W 52/0216* (2013.01); *H04W 52/0229* (2013.01); *H04L 5/0023* (2013.01); *H04L 27/0006* (2013.01); *H04W 24/10* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/20* (2018.01); *Y02D 70/21* (2018.01); *Y02D 70/22* (2018.01); *Y02D 70/24* (2018.01); *Y02D 70/25* (2018.01); *Y02D 70/444* (2018.01)

(56) References Cited

U.S. PATENT DOCUMENTS

| | | |
|---|---|---|
| 9,445,383 B2 | 9/2016 | Womack et al. |
| 2015/0078189 A1* | 3/2015 | Kwon ............... H04W 52/0216 370/252 |
| 2015/0201383 A1* | 7/2015 | Papasakellariou .. H04W 52/367 370/278 |
| 2017/0048920 A1 | 2/2017 | Kim et al. |

OTHER PUBLICATIONS

International Search Report and Written Opinion—PCT/US2018/020670—ISA/EPO—dated May 16, 2018.
Samsung: "NR Connected DRX Operation with Beamforming", 3GPP Draft; R2-168816 NR Connected DRX Operation with Beamforming, 3rd Generation Partnership Project (3GPP), Mobile Competence Centre; 650, Route Des Lucioles ; F-06921 Sophia-Antipolis Cedex ; France, vol. RAN WG2, No. Reno, USA; Nov. 14, 2016-Nov. 18, 2016, Nov. 14, 2016 (Nov. 14, 2016), 5 Pages, XP051178384, Retrieved from the Internet: URL: http://www.3gpp.org/ftp/Meetings_3GPP_SYNC/RAN2/Docs/ [retrieved on Nov. 14, 2016].

* cited by examiner

BEAM MANAGEMENT FOR CONNECTED MODE DISCONTINUOUS RECEPTION OPERATION

CROSS REFERENCES

The present Application for Patent claims priority to U.S. Provisional Patent Application No. 62/467,046 by Nagaraja et al., entitled "Beam Management For Connected Mode Discontinuous Reception Operation," filed Mar. 3, 2017, assigned to the assignee hereof.

BACKGROUND

The following relates generally to wireless communication, and more specifically to beam management for connected mode discontinuous reception (C-DRX) operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems (e.g., NR systems) may operate at higher frequencies or use multiple beams for communications between wireless devices. Such operations may be subject to higher path losses. Signal processing techniques, such as beamforming, may be used to combine energy coherently and overcome the higher path losses in these systems. UEs in such systems may operate in a connected mode discontinuous reception (C-DRX) mode (e.g., support low-power/sleep states to conserve power), and may wake up occasionally (e.g., during a C-DRX ON duration) to check for a grant received from a base station in, for example, a downlink control region of a downlink transmission. In some cases, however, one or more active beam pairs between two wireless devices may become misaligned (e.g., during a C-DRX OFF duration), which may result in beam and/or communication failure such as control channel decoding failures. Thus, improved techniques for beam management during C-DRX operation may be desired.

SUMMARY

The described techniques relate to improved methods, systems, devices, or apparatuses that support beam management for connected mode discontinuous reception (C-DRX) operation. Generally, the described techniques provide for beam management procedures before monitoring for control information during a subsequent C-DRX ON duration. A base station may transmit a beam management parameter to a user equipment (UE) while the UE is in a C-DRX OFF state. The beam management parameter may indicate a time interval for reception of downlink reference signals (RSs) prior to the beginning of a next C-DRX ON state.

The UE may monitor for downlink RSs, and transmit an uplink measurement report during the C-DRX OFF state, which may indicate a reconfigured active beam pair for use during the next C-DRX ON duration. In some cases, the UE may transmit uplink RSs to the base station, and the base station may select an active beam pair for use during the next C-DRX ON duration based on the uplink RSs. The UE may monitor for control information (e.g., in a physical downlink control channel (PDCCH)) according to the reconfigured active beam pair.

A method of for wireless communication is described. The method may include receiving, at a UE, a UE-specific beam management configuration parameter from a base station, receiving, while the UE is in a C-DRX OFF state, a reference signal from the base station during a time interval based at least in part on the UE-specific beam management configuration parameter, and selectively reconfiguring, while the UE is in the C-DRX OFF state, an active beam between the base station and the UE based at least in part on the reference signal.

An apparatus for wireless communication is described. The apparatus may include means for receiving, at a UE, a UE-specific beam management configuration parameter from a base station, means for receiving, while the UE is in a C-DRX OFF state, a reference signal from the base station during a time interval based at least in part on the UE-specific beam management configuration parameter, and means for selectively reconfiguring, while the UE is in the C-DRX OFF state, an active beam between the base station and the UE based at least in part on the reference signal.

Another apparatus for wireless communication is described. The apparatus may include a processor, memory in electronic communication with the processor, and instructions stored in the memory. The instructions may be operable to cause the processor to receive, at a UE, a UE-specific beam management configuration parameter from a base station, receive, while the UE is in a connected mode discontinuous reception (C-DRX) off state, a reference signal from the base station during a time interval based at least in part on the UE-specific beam management configuration parameter, and selectively reconfigure, while the UE is in the C-DRX OFF state, an active beam between the base station and the UE based at least in part on the reference signal.

A non-transitory computer readable medium for wireless communication is described. The non-transitory computer-readable medium may include instructions operable to cause a processor to receive, at a UE, a UE-specific beam management configuration parameter from a base station, receive, while the UE is in a connected mode discontinuous reception (C-DRX) off state, a reference signal from the base station during a time interval based at least in part on the UE-specific beam management configuration parameter, and selectively reconfigure, while the UE is in the C-DRX OFF state, an active beam between the base station and the UE based at least in part on the reference signal.

Some examples of the method, apparatus, and non-transitory computer-readable medium described above may further include processes, features, means, or instructions for determining, based at least in part on the UE-specific beam management configuration parameter, the time interval for reception of the reference signal with respect to a scheduled beginning of a C-DRX ON state.

Some examples of the method, apparatus, and non-transitory computer-readable medium described above may further include processes, features, means, or instructions for transmitting, to the base station and while the UE may be in the C-DRX OFF state, a selection of a new active beam based at least in part on selectively reconfiguring the active beam.

Some examples of the method, apparatus, and non-transitory computer-readable medium described above may further include processes, features, means, or instructions for determining a quality of the active beam between the UE and the base station based at least in part on the reference signal. Some examples of the method, apparatus, and non-transitory computer-readable medium described above may further include processes, features, means, or instructions for selectively reconfiguring the active beam may be based at least in part on the determined quality of the active beam.

Some examples of the method, apparatus, and non-transitory computer-readable medium described above may further include processes, features, means, or instructions for transmitting, to the base station and while the UE may be in the C-DRX OFF state, at least one of a UE reference signal or a request for an uplink grant based at least in part on the determined quality of the active beam.

In some examples of the method, apparatus, and non-transitory computer-readable medium described above, selectively reconfiguring the active beam comprises: determining to reconfigure the active beam if the determined quality of the active beam fails to satisfy a quality threshold.

Some examples of the method, apparatus, and non-transitory computer-readable medium described above may further include processes, features, means, or instructions for transmitting, to the base station and while the UE may be in the C-DRX OFF state, a measurement report of the reference signal based at least in part on selectively reconfiguring the active beam.

Some examples of the method, apparatus, and non-transitory computer-readable medium described above may further include processes, features, means, or instructions for determining a time to transmit the measurement report of the reference signal based at least in part on a first UE gap parameter.

Some examples of the method, apparatus, and non-transitory computer-readable medium described above may further include processes, features, means, or instructions for receiving the first UE gap parameter from the base station.

In some examples of the method, apparatus, and non-transitory computer-readable medium described above, the first UE gap parameter may be based at least in part on a UE power-up capability.

Some examples of the method, apparatus, and non-transitory computer-readable medium described above may further include processes, features, means, or instructions for determining a set of uplink resources for transmitting the measurement report based at least in part on a set of downlink resources used to receive the reference signal.

Some examples of the method, apparatus, and non-transitory computer-readable medium described above may further include processes, features, means, or instructions for determining a time to receive control information from the base station during the C-DRX OFF state based at least in part on a second UE gap parameter and a time of transmission of the measurement report.

Some examples of the method, apparatus, and non-transitory computer-readable medium described above may further include processes, features, means, or instructions for receiving the second UE gap parameter from the base station.

In some examples of the method, apparatus, and non-transitory computer-readable medium described above, the second UE gap parameter may be based at least in part on a UE uplink/downlink transition capability.

Some examples of the method, apparatus, and non-transitory computer-readable medium described above may further include processes, features, means, or instructions for receiving the control information from the base station over the active beam.

A method of for wireless communication is described. The method may include transmitting, to the UE, a UE-specific beam management configuration parameter indicating a time interval for reception of a reference signal, transmitting the reference signal to the UE while the UE is in a connected mode discontinuous reception (C-DRX) OFF state, and selectively reconfiguring, while the UE is in the C-DRX OFF state, the active beam based at least in part on a response to the reference signal from the UE.

An apparatus for wireless communication is described. The apparatus may include means for transmitting, to the UE, a UE-specific beam management configuration parameter indicating a time interval for reception of a reference signal, means for transmitting the reference signal to the UE while the UE is in a connected mode discontinuous reception (C-DRX) off state, and means for selectively reconfiguring, while the UE is in the C-DRX OFF state, the active beam based at least in part on a response to the reference signal from the UE.

Another apparatus for wireless communication is described. The apparatus may include a processor, memory in electronic communication with the processor, and instructions stored in the memory. The instructions may be operable to cause the processor to transmit, to the UE, a UE-specific beam management configuration parameter indicating a time interval for reception of a reference signal, transmit the reference signal to the UE while the UE is in a connected mode discontinuous reception (C-DRX) off state, and selectively reconfigure, while the UE is in the C-DRX OFF state, the active beam based at least in part on a response to the reference signal from the UE.

A non-transitory computer readable medium for wireless communication is described. The non-transitory computer-readable medium may include instructions operable to cause a processor to transmit, to the UE, a UE-specific beam management configuration parameter indicating a time interval for reception of a reference signal, transmit the reference signal to the UE while the UE is in a connected mode discontinuous reception (C-DRX) OFF state, and selectively reconfigure, while the UE is in the C-DRX OFF state, the active beam based at least in part on a response to the reference signal from the UE.

Some examples of the method, apparatus, and non-transitory computer-readable medium described above may further include processes, features, means, or instructions for determining the time interval for reception of the reference signal with respect to a scheduled beginning of a C-DRX ON state for the UE.

Some examples of the method, apparatus, and non-transitory computer-readable medium described above may further include processes, features, means, or instructions for receiving, from the UE and while the UE may be in the C-DRX OFF state, a measurement report of the reference signal.

Some examples of the method, apparatus, and non-transitory computer-readable medium described above may further include processes, features, means, or instructions for establishing an active beam for communication with a UE.

Some examples of the method, apparatus, and non-transitory computer-readable medium described above may further include processes, features, means, or instructions for transmitting, to the UE, at least one of a first UE gap parameter and a second UE gap parameter.

Some examples of the method, apparatus, and non-transitory computer-readable medium described above may further include processes, features, means, or instructions for receiving, from the UE, an indication of capabilities of the UE, wherein transmitting at least one of the first gap parameter and the second gap parameter may be based at least in part on the capabilities of the UE.

Some examples of the method, apparatus, and non-transitory computer-readable medium described above may further include processes, features, means, or instructions for receiving, from the UE and while the UE may be in the C-DRX OFF state, a selection of a new active beam, wherein selectively reconfiguring the active beam may be based at least in part on the selection of the new active beam.

Some examples of the method, apparatus, and non-transitory computer-readable medium described above may further include processes, features, means, or instructions for receiving, from the UE and while the UE may be in the C-DRX OFF state, at least one of a UE reference signal or a request for an uplink grant based at least in part on the reference signal.

DETAILED DESCRIPTION

Communications in mmW frequency bands may experience higher signal attenuation (e.g., path loss) than other bands used for wireless communications. As a result, signal processing techniques such as beamforming may be used to combine energy coherently and overcome the path losses in these systems. In systems supporting multi-beam operation, a pair of wireless devices, such as a user equipment (UE) and base station, may be able to communicate over one or more active beam pairs. An active beam pair may correspond to a transmit beam used at the transmitting device and a receive beam at a receiving device (e.g., a beam pair). Further, wireless devices in these systems may support connected mode discontinuous reception (C-DRX) operation. C-DRX operation may enable wireless devices to enter low-power/sleep states to conserve power, while occasionally waking up to monitor for transmissions from a base station.

In some cases, the active beam pair(s) may become misaligned (e.g., during C-DRX OFF or sleep states) such that the UE and base station may not be able to communicate when the UE wakes up from a C-DRX OFF or sleep state. For example, control channel decoding failures at the UE during the next C-DRX ON duration may occur due to active beam pair degradation during a C-DRX OFF duration (e.g., due to fading, UE mobility, signal blockage, etc.).

In some examples, wireless devices in a wireless communications system may perform a beam management procedure in order to reestablish (e.g., realign), or in some cases establish, active beam pair links. For beam management procedures, a base station may configure a UE to monitor downlink reference signals to determine a beam failure prior to C-DRX ON operation. Thus, the UE may select or establish a better beam for improved control channel reception (e.g., improved physical downlink control channel (PDCCH) decoding during C-DRX ON operation).

Aspects of the disclosure are initially described in the context of a wireless communications system. Example timelines and process flows supporting techniques for beam management during C-DRX operation are then described. Aspects of the disclosure are further illustrated by and described with reference to apparatus diagrams, system diagrams, and flowcharts that relate to beam management for C-DRX operation.

Figure 1:
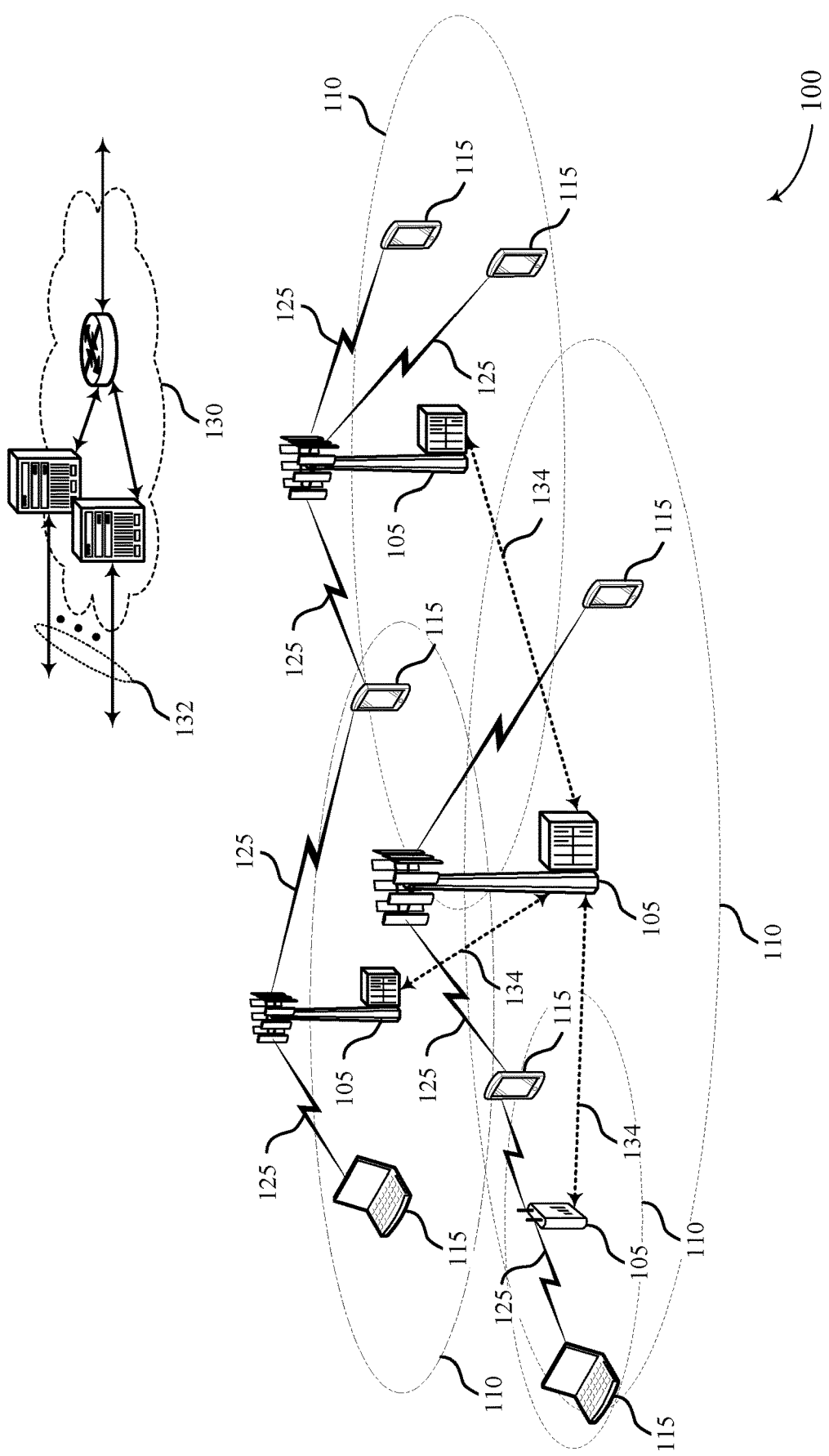
FIG. 1 illustrates an example of a system for wireless communication that supports beam management for connected mode discontinuous reception (C-DRX) operation in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Wireless communication system 100 may support dynamic receive opportunity (RO) and transmit opportunity (TO) configurations to enable reduced latency and reduced power consumption. For example, wireless communication system 100 may support a TO following the reception of data during the "ON" duration of a C-DRX configuration. Additionally or alternatively, a subsequent RO may follow the transmission of data during the ON duration of a discontinuous transmission (DTX) configuration. Wireless communications system 100 may support improved techniques for beam management for C-DRX operation.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques.

Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support multi-beam communications between UEs 115 and base stations 105. Devices operating in systems supporting multi-beam operation (e.g., mmW or EHF bands) may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 115) to shape and/or steer an overall antenna beam in the direction of a target receiver (e.g., a UE 115). This may be achieved by combining elements in an antenna array in such a way that transmitted signals at particular angles experience constructive interference while others experience destructive interference. In some cases, hybrid beamforming may refer to analog and digital beamforming techniques. Such beamforming techniques may permit multi-beam operation with one or more UEs 115 and may enhance link budget, signal-to-noise ratio (SNR), etc.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A receiver supporting multi-beam operation (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some wireless communication networks, mobile devices may be required to perform beam management to evaluate the quality of one or more active beam links between the base stations 105 (e.g., eNBs, etc.) and the mobile devices (e.g., UE 115, etc.). If the link is degraded beyond a certain point (e.g., below a threshold), the mobile devices may be unable to successfully communicate over that link. In accordance with aspects herein, beam management may be utilized to help prevent mobile devices from continuing to transmit when the link quality has degraded to such an extent, which in turn keeps mobile devices from tying up system resources and/or causing excessive or additional interference with other devices of the wireless communications systems.

In some cases, a UE 115 may monitor a communication link 125 continuously for an indication that the UE 115 may receive data. In other cases (e.g., to conserve power and extend battery life) a UE 115 may be configured with a DRX or DTX cycle. A DRX cycle consists of an "DRX ON duration" when the UE 115 may monitor for control information (e.g., on PDCCH) and a "DRX OFF duration" when the UE 115 may power down radio components. A DTX cycle consists of a, "DTX ON duration" when the UE 115 may transmit a scheduling request and a "DTX OFF period" when the UE 115 may power down radio components. In some cases, a UE 115 may be configured with a short DRX or DTX cycle and a long DRX or DTX cycle. In some cases, a UE 115 may enter a long DRX or DTX cycle if the UE 115 is inactive for one or more short DRX or DTX cycles. Such cycles may determine subframes or time intervals during which the UE 115 is "ON" or "OFF," and may last up to, for example, 2560 subframes. A C-DRX mode (or connected mode DRX), may refer to a mode where a UE 115 may maintain an RRC connection with a base station 105 (e.g., operate in RRC CONNECTED mode) while powering off certain components of the UE 115 for some predetermined interval as discussed above.

Base stations 105 and UEs 115 may communicate with each other over active beam pairs (e.g., base station 105 and UE 115 beam pairs that carry data and control channels such as physical downlink shared channel (PDSCH), PDCCH, physical uplink shared channel (PUSCH), and physical uplink control channel (PUCCH)). A beam pair link may refer to a pairing of a transmit beam (e.g., from a base station) and a receive beam (e.g., at a UE), with each beam being formed by an array of antennas at the corresponding device. In other examples, the beam pair link may include a transmit beam from a UE and a receive beam at a base station. In some cases, active beam pairs may become misaligned due to beam switch failures, signal blockage, etc. In such cases, active beam pairs may be unsuitable for communications (e.g., of data or control information). In some examples, base stations 105 may configure UEs 115 to monitor downlink reference signals (RSs) for beam monitoring. The UEs 115 may measure the RS quality and select a better beam for control channel decoding during subsequent DRX ON durations.

Figure 2:
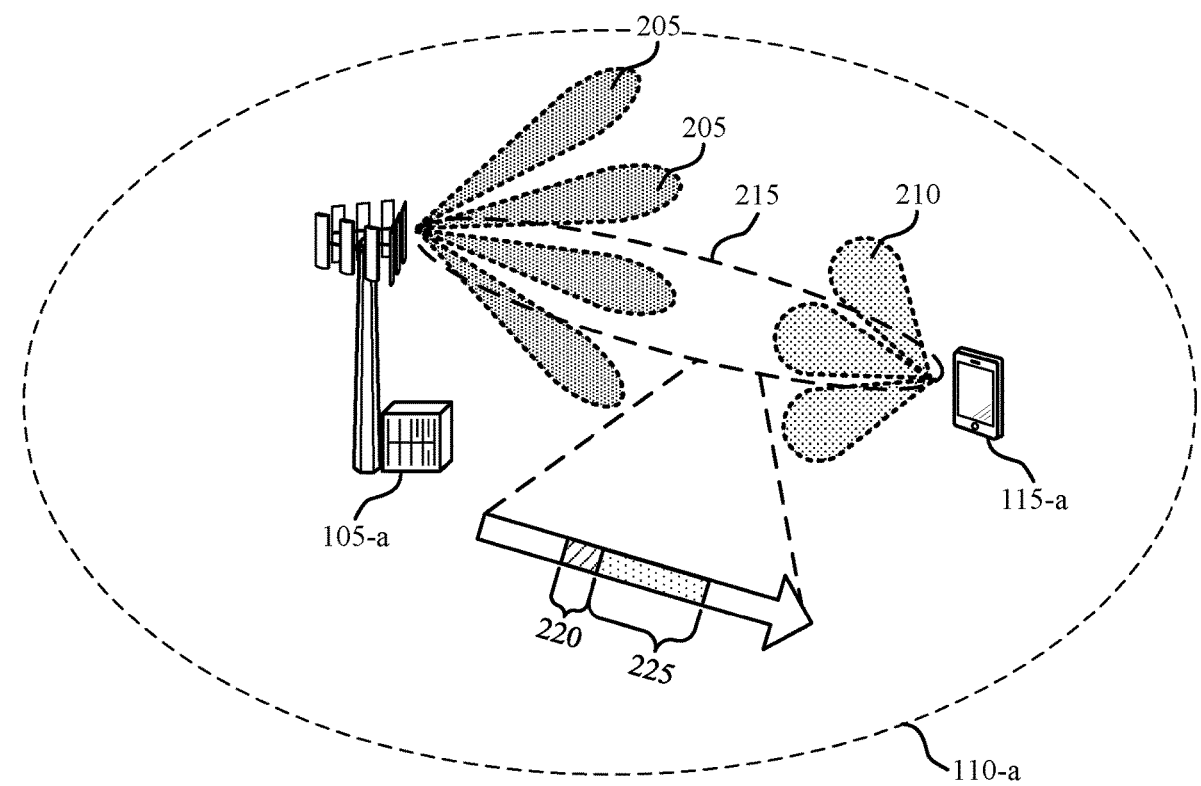
FIG. 2 illustrates an example of a wireless communications system that supports beam management for C-DRX operation in accordance with aspects of the present disclosure.

FIG. 2 illustrates an example of a wireless communications system 200 that supports beam management for C-DRX operation in accordance with various aspects of the present disclosure. Wireless communications system 200 includes a base station 105-a and a UE 115-a, each of which may be an example of the corresponding devices as described with reference to FIG. 1.

Wireless communications system 200 may support beamformed transmissions between base station 105-a and UE 115-a. For example, wireless communications system 200 may operate using multiple communication beams (e.g., in mmW frequency ranges). As a result, signal processing techniques, such as beamforming may be used to combine energy coherently and overcome path losses. By way of example, base station 105-a may contain multiple antennas. In some cases, each antenna may transmit (or receive) a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit wireless communications system 200.

Base station 105 may include beams 205 for communication and UE 115 may also include beams 210 for communication, which represent examples of beams over which data (or control information) may be transmitted or received according to beamforming techniques described herein. Accordingly, each beam 205 may be directed from base station 105-a toward a different region of the coverage area 110-a and in some cases, two or more beams may overlap. Beams 205 may be transmitted simultaneously or at different times. In either case, a UE 115-a may be capable of receiving the information in one or more beams 205 via respective beams 210.

Similar to base station 105-a, UE 115-a may include multiple antennas and may form one or more beams 210 through the use of various antenna arrays. The beams 210 may be used to receive transmissions from beams 205 (e.g., UE 115-a may be positioned within wireless communications system 200 such that it receives beamformed transmissions associated with certain beams 205). Such a scheme may be referred to as a receive-diversity scheme. In some cases, the beams 210 may receive beams 205 with various path loss and multipath effects included.

A beam 205 and a corresponding beam 210 may be referred to as an active beam 215, a beam pair, or beam pair link. The active beam 215 may be established during cell acquisition (e.g., through synchronization signals) or through a beam refinement procedure where the UE 115-a and base station 105-a try various combinations of finer transmission beams and reception beams until a suitable active beam 215 is determined. An active beam 215 established for one or both of downlink and uplink communications may be referred to as a downlink or uplink active beam 215, respectively, and in some examples, an active beam may support both uplink and downlink communications. In some cases, each active beam 215 may be associated with a signal quality (e.g., such that UE 115-a and base station 105-a may preferentially communicate over an active beam 215 associated with a better signal quality) and each active beam 215 may carry one or more channels. Examples of such channels include the PDSCH, the PDCCH, the PUSCH, and the PUCCH.

In multi-beam and C-DRX operation, one or more active beam pairs 215 may become misaligned (e.g., during C-DRX OFF). This misalignment may be the result of fading, UE 115-a mobility, signal blockage, etc. In such a scenario, the active beam 215 may be misaligned at the next C-DRX ON duration and may result in communication failures (e.g., PDCCH decoding failure at UE 115-a). Such communication failures may result in increased latency to initiate data transfers, radio link failure (RLF), etc.

Therefore, base station 105-a may configure beam management procedures prior to C-DRX ON durations, enabling UE 115-a to select a better active beam 215 (e.g., beam 210) for PDCCH decoding during the subsequent C-DRX ON duration. In some examples, the beam management procedure may enable base station 105-a to select a better active beam 215 (e.g., beam 205) for the transmission of the PDCCH during the subsequent C-DRX ON duration (e.g., by configuring the beam management procedure to include uplink RSs from the UE 115-a). In some cases, the base station 105-a may configure the beam management procedure to coincide with transmissions (e.g., RS transmissions) that occur prior to the UE 115-a C-DRX ON duration. That is, base station 105-a may configure the beam management procedure to be performed variable number of slots or mini-slots prior to the UE 115-a C-DRX ON duration as further described with reference to FIG. 4.

Figure 3:
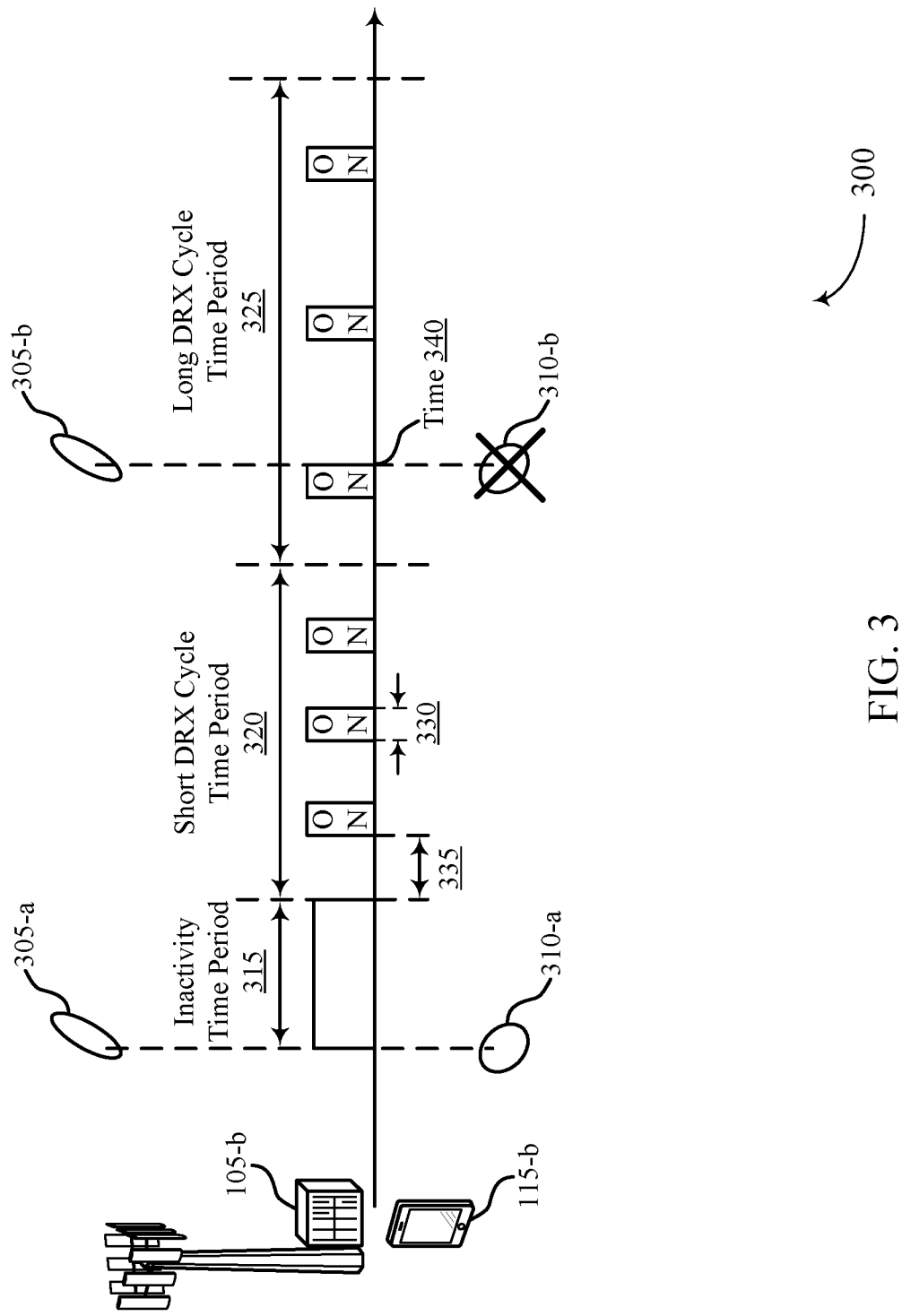
FIGS. 3 through 5 illustrate examples of a C-DRX timelines that support beam management for C-DRX operation in accordance with aspects of the present disclosure.

FIG. 3 illustrates an example of a C-DRX timeline 300 that supports beam management for C-DRX operation in accordance with various aspects of the present disclosure. C-DRX timeline 300 includes a base station 105-b and a UE 115-b, each of which may be an example of the corresponding devices as described with reference to FIGS. 1 and 2. Base station 105-b may utilize beams 305 for communication, and UE 115-b may utilize beams 310 for communication. Beams 305-a and 310-a, and beams 305-b and 310-b may constitute beam pairs (e.g., which may be an example of a corresponding active beam 215 as described with reference to FIG. 2). C-DRX timeline 300 may illustrate how a beam pair may become misaligned (e.g., active beam pair degradation) prior to PDCCH decoding at a C-DRX ON duration.

C-DRX timeline 300 illustrates an example of an inactivity time period 315, a short DRX cycle time period 320, and a long DRX cycle time period 325. During an inactivity time period 315, UE 115-b may monitor for any transmissions (e.g., PDCCH) from base station 105-b. If the inactivity timer expires (e.g., inactivity time period 315 elapses) with no transmissions being received, UE 115-b may enter a short DRX cycle (e.g., for a short DRX cycle time period 320). If no transmissions (e.g., PDCCH) from base station 105-b are received over the short DRX cycle time period 320, UE 115-b may then enter a long DRX cycle (e.g., for a long DRX cycle time period 325). A short DRX cycle may be associated with relatively shorter gaps (e.g., compared to long DRX cycle gaps, as illustrated in the long DRX cycle period 325) between DRX ON durations 330. That is, short DRX cycles may be associated with shorter DRX OFF durations 335 than long DRX cycles.

Within the long DRX cycle, base station 105-b may have control information for UE 115-b at time 340. At time 340, however, the active beam pair associated with beam 305-b and beam 310-b may have become misaligned (e.g., due to fading, UE 115-b mobility, signal blockage, etc., which may have occurred between the inactivity time period 315 and time 340), and UE 115-b may experience decoding failures (e.g., as shown on beam 310-b). C-DRX timeline 300 illustrates a single example only. In some cases, a base station 105 may have PDCCH within the short DRX cycle, and beam pair degradation may occur over a single DRX OFF duration 335. By analogy, techniques for beam management prior to C-DRX ON durations described below may be applied to these and other C-DRX scenarios.

Figure 4:
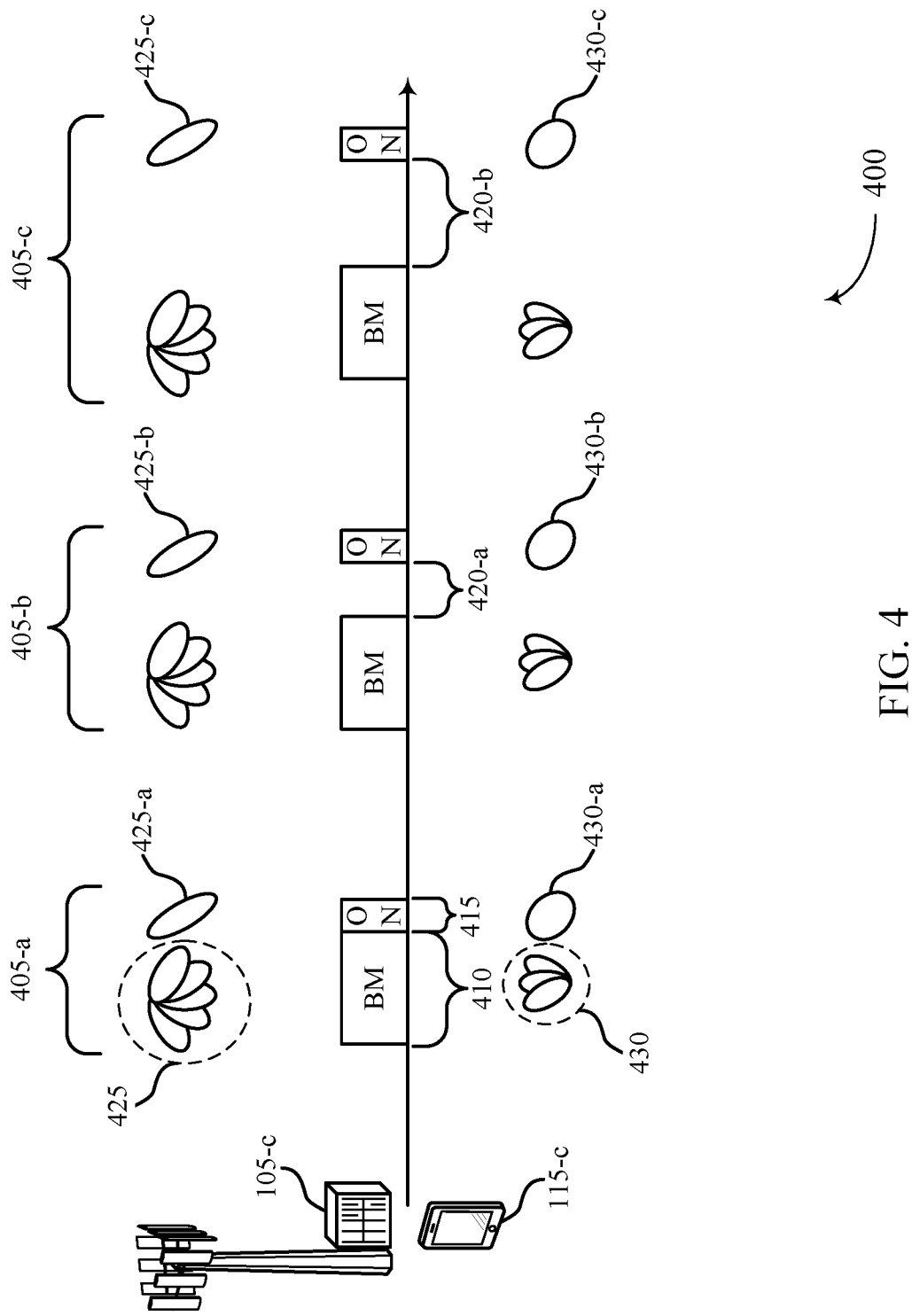

FIG. 4 illustrates an example of a C-DRX timeline 400 that supports beam management for C-DRX operation in accordance with various aspects of the present disclosure. C-DRX timeline 400 includes a base station 105-c and a UE 115-c, each of which may be an example of the corresponding devices as described with reference to FIGS. 1 through 3. Base station 105-c may utilize beams 425 for communication, and UE 115-c may utilize beams 430 for communication. Beams 425-a and 430-a, beams 425-b and 430-b, and beams 425-c and 430-c may constitute active beam pairs (e.g., which may be an example of a corresponding active beam 215 as described with reference to FIG. 2). C-DRX timeline 400 may illustrate three example beam management procedures 405, where different beam management techniques are performed in beam management windows 410 prior to PDCCH decoding at a C-DRX ON duration 415.

Beam management procedures 405 may include beam management operations performed within beam management windows 410. In some cases, there may be gaps 420 between beam management windows 410 and C-DRX ON durations 415, as illustrated in beam management procedures 405-b and 405-c, for example. In some cases, gaps 420 between beam management windows 410 and C-DRX ON durations 415 may include an X number of time periods (e.g., slots, symbols, mini-slots, etc.) and as shown in beam management procedure 405-a, X=0. X may be an example of a UE-specific beam management configuration parameter. X may depend on UE 115-c mobility, DRX cycles, UE 115-c capabilities indicated after a random access channel (RACH) procedure (e.g., uplink/downlink switching time), etc. For example, gap 420-b may be larger (e.g., include a larger slot offset from the next C-DRX ON duration 415) than gap 420-c due to differences in timing of downlink RSs during beam management procedures 405-b and 405-c. Further, base station 105-c may configure X such that the beam management window 410 coincides with a slot or mini-slot of a RS transmission (e.g., new radio synchronization signal (NR-SS), channel state information reference signal (CSI-RS), etc.). The value of X may be determined from UE 115-c measurement reports that may include beam identification (e.g., a beam ID selected from downlink RSs from base station 105-c), system frame number (SFN), slot/mini-slot information, logical beam mapping, etc. In some cases, the value of X may be configured for a group of UEs 115. In such cases, base station 105-c may provide UE 115-c with a configuration of uplink resources for measurement report transmissions. Uplink resources may be mapped to downlink RSs such that UE 115-c may transmit measurement reports on the uplink to base station 105-c during a beam management window 410. UE 115-c may then choose one or more uplink resources to transmit the measurement report.

During a beam measurement window 410, UE 115-c may measure downlink RSs to determine the quality of an active beam pair or to identify a more suitable beam pair. That is, base station 105-c may transmit downlink RSs according to one or more beams 425 (e.g., beam directions). In some cases, some downlink RS beam directions (e.g., beams 425) may be skipped. In other cases, downlink RS may be sent along a union of beam directions (e.g., along a union of one or more beams 425), such as in a beam refinement procedure. If the active beam quality is determined to be sufficient for communications (e.g., via a downlink RS associated with the active beam pair), UE 115-c may elect not to transmit a measurement report and may go back to sleep (e.g., return to a C-DRX OFF state), request an uplink grant for uplink data (if needed), elect to transmit a measurement report regardless, transmit an uplink RS, etc. For example, it may be determined that an active beam pair associated with beam 425-a and beam 430-a is sufficient via a downlink RS measurement performed during a beam management window 410 of beam management procedure 405-a. During beam management procedure 405-b, base station 105-c may transmit a downlink RS along a beam direction associated with beam 425-a, and if UE 115-c determines the quality associated with the active beam pair associated with beams 425-a and 430-a is sufficient, the active beam pair may be used again for the next C-DRX ON duration 415 (e.g., beam 430-b may be associated with the same beam ID as beam 430-a).

If the beam quality is poor for the active beam pair, UE 115-c may identify another beam pair via another beam direction associated with the downlink RSs. In such cases, beam 430-b may be associated with a different beam ID than beam 430-a. To determine the active beam pair associated with beams 425-b and 430-b, UE 115-c may transmit a measurement report indicating the top N beams to base station 105-c during the beam measurement window 410. In some cases, base station 105-c may select a beam pair associated with one of the top N beams. In other cases, UE 115-c may explicitly indicate a desired beam pair in the measurement report. In yet other cases, base station 105-c may configure UE 115-c to transmit uplink RSs within beam management window 410. Base station 105-c may then perform measurements on uplink RSs and indicate to UE 115-c a selected beam pair for communications during the next C-DRX ON duration 415. In such beam switching scenarios, base station 105-c and UE 115-c may implicitly switch to the best beam for the next C-DRX ON duration, or the base station 105-c may send an explicit beam switch indication during the next C-DRX ON duration 415. If the beam quality is determined to be poor for all directions (e.g., beam IDs) associated with the downlink RS measurements, UE 115-c may perform a beam recovery procedure, RLF, forward handover, etc.

Figure 5:
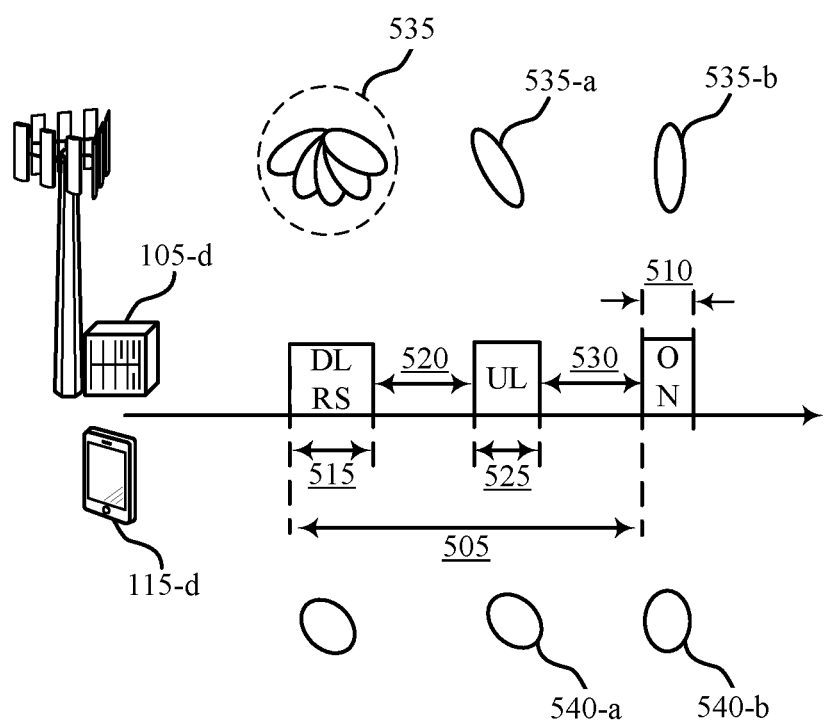

FIG. 5 illustrates an example of a C-DRX timeline 500 that supports beam management for C-DRX operation in accordance with various aspects of the present disclosure. C-DRX timeline 500 includes a base station 105-d and a UE 115-d, each of which may be an example of the corresponding devices as described with reference to FIGS. 1 through 4. Base station 105-d may utilize beams 535 for communication, and UE 115-d may utilize beams 540 for communication. Beams 535-*a* and 540-*a* and beams 535-*b* and 540-*b* may constitute active beam pairs (e.g., which may be an example corresponding beam pairs 215 as described with reference to FIG. 2). C-DRX timeline 500 may illustrate example beam management techniques (e.g., self-contained resources for RS measurements and reporting) within beam management windows 505 prior to PDCCH decoding at a C-DRX ON durations 510.

In the present example, beam management window 505 includes a downlink duration 515, a downlink-to-uplink duration 520, an uplink duration 525, and an uplink-to-downlink duration 530. Base station 105-*d* may transmit downlink RSs associated with one or more beam IDs or directions (e.g., over beams 535) during downlink duration 515. Base station may configure downlink-to-uplink duration 520 (e.g., defined as some number of slots/mini-slots) for UE 115-*d* to switch from downlink RS measurements to uplink transmission of measurement reports (e.g., associated with the downlink RS measurements). The downlink-to-uplink duration 520 may be a predetermined number of slots/mini-slots or may be indicated by the downlink RSs. The downlink-to-uplink duration 520 may be set as a function of UE 115-*d* capability, memory, processing time, warm-up of radio frequency (RF)/baseband, etc. During uplink duration 525, UE 115-*d* may transmit uplink measurement reports (e.g., based on downlink RS measurements during downlink duration 515) to base station 105-*d*. Uplink-to-downlink duration 530 may also be configured by the base station 105-*d*. UE 115-*d* may switch from uplink measurement report transmission to downlink reception (e.g., of PDCCH during the next C-DRX ON duration 501) during the uplink-to-downlink duration 530. The uplink-to-downlink duration 530 may be a predetermined number of slots/mini-slots or may be indicated by the downlink RSs. The uplink-to-downlink duration 530 may be set as a function of UE 115-*d* capability, memory, processing time, warm-up of RF/baseband, etc.

Figure 6:
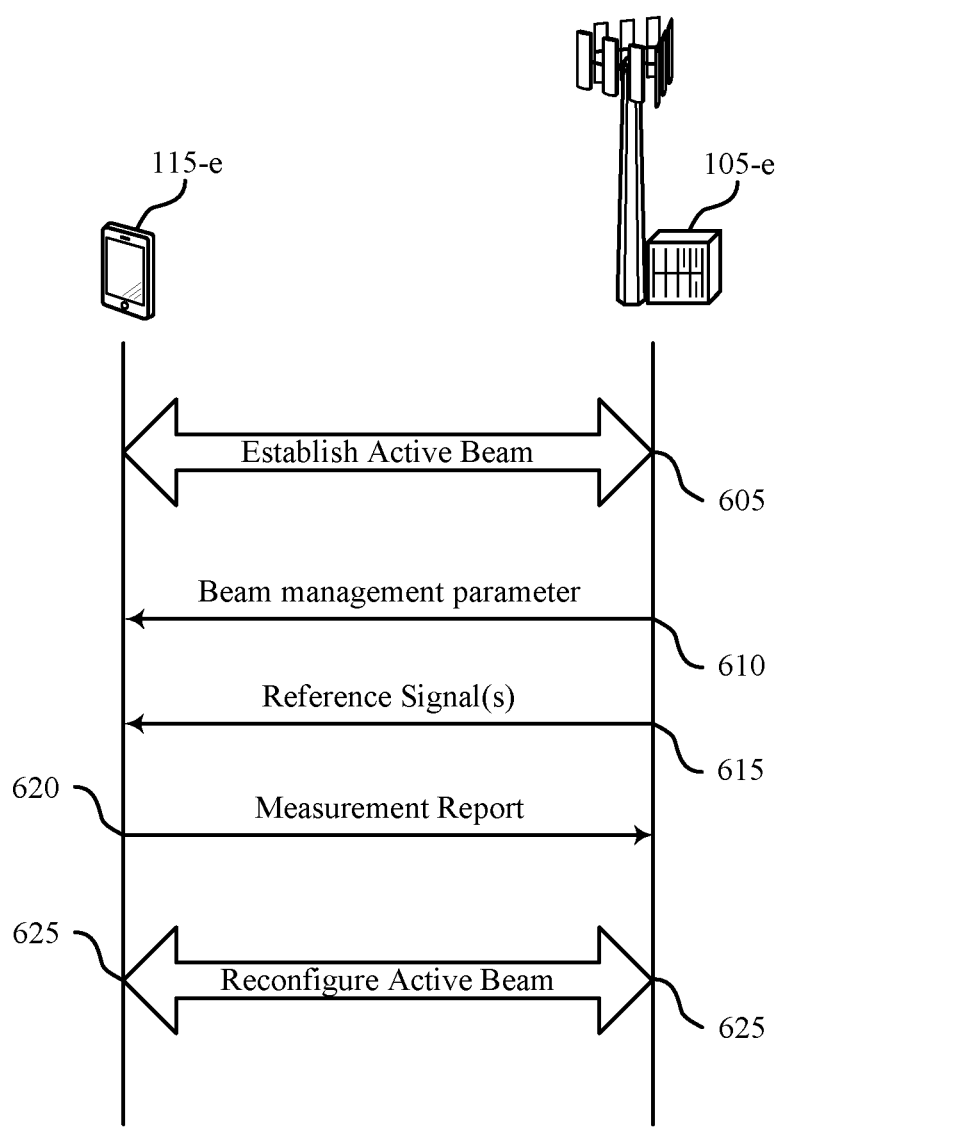
FIG. 6 illustrates an example of a process flow that supports beam management for C-DRX operation in accordance with aspects of the present disclosure.

FIG. 6 illustrates an example of a process flow 600 that supports beam management for C-DRX operation in accordance with various aspects of the present disclosure. Process flow 600 includes a base station 105-*e* and a UE 115-*e*, each of which may be an example of the corresponding devices as described with reference to FIGS. 1 through 5.

At step 605, base station 105-*e* may establish an active beam (e.g., an active beam pair) for communication with UE 115-*e*.

At step 610, base station 105-*e* may transmit a UE-specific beam management configuration parameter to UE 115-*e*. A UE-specific parameter may refer to a parameter unique to a single UE or to a group of UEs. The UE-specific beam management configuration parameter may indicate a time interval during which UE 115-*e* may receive a RS. In some cases, the time interval for the RSs may be scheduled relative to the beginning of a next D-DRX ON state for the UE 115-*e*. The DRX cycle may be UE-specific, and the time interval for the RSs may also be UE specific. In some cases, a group of UEs may have a similar beginning of a DRX ON state and may have a similar time interval. The time interval may also be based on factors other than the DRX cycle timing, for example, UE-capability or processing time. In some cases, step 610 may include the base station 105-*e* transmitting UE gap parameters to UE 115-*e*. The UE gap parameters may be based on the capabilities of UE 115-*e* (e.g., a power-up capability, uplink/downlink transition capability, etc.) and may, in some cases, indicate a gap for uplink/downlink switching between step 615 and 620 and a gap for downlink/uplink switching between step 620 and the next C-DRX ON duration.

At step 615, base station 105-*e* may transmit one or more RSs to UE 115-*e* while UE 115-3 is in a C-DRX OFF state (e.g., in a D-DRX OFF duration). The time the RSs are transmitted to the UE 115-*e* may depend on a UE gap parameter received at step 610. The UE 115-*e* may determine a quality of the active beam established at step 605 based on the received RSs. Subsequent reconfiguration of the active beam, or selection of a new active beam, may be based on the active beam quality determined from the RSs.

At step 620, UE 115-*e* may transmit a measurement report, based on the monitored downlink RSs received at step 615, to base station 105-*e*. The measurement report may also be transmitted within the C-DRX OFF state. In some cases, the measurement report may include a UE specific RS, or a request for an uplink grant (e.g., based on the RS). In cases where the UE 115-*e* transmits uplink resources, base station 105-*e* may select or reconfigure the active beam. In some cases, the uplink resources (e.g., beam ID) used for the measurement report may be based on the received downlink RSs.

At step 625, base station 105-*e* and UE 115-*e* may reconfigure (e.g., selectively), or determine whether to reconfigure, the active beam. Base station 105-*e* may reconfigure the active beam based on the measurement report received at step 620. UE 115-*e* may reconfigure the active beam based on the downlink RSs received at step 615. Although shown as the last step of process flow 600 UE 115-*e* may reconfigure the active beam prior to step 620 (e.g., prior to transmission of the measurement report). In such cases, the measurement report may include a selection of a new active beam.

Figure 7:
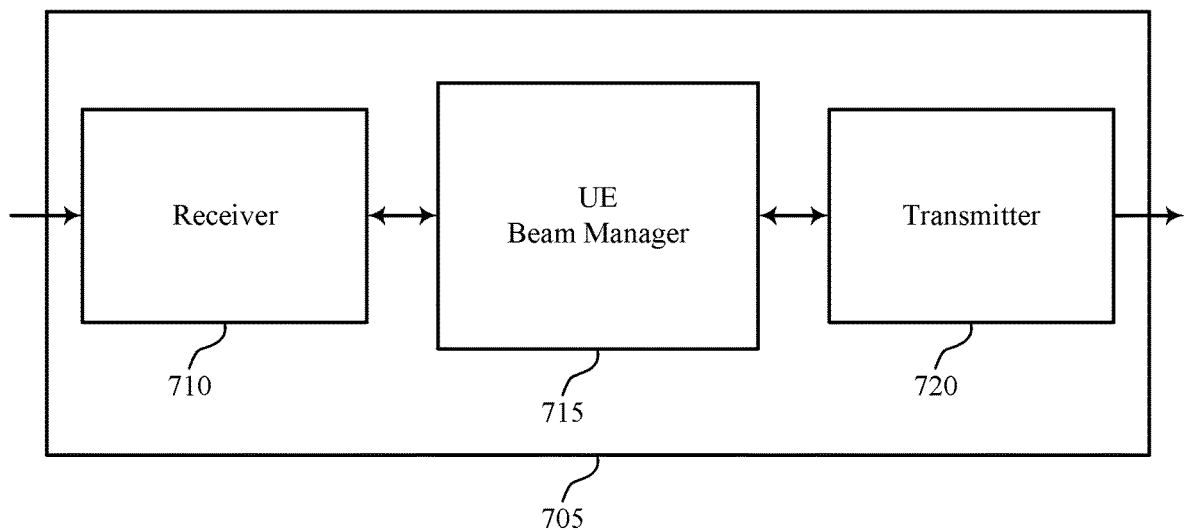
FIGS. 7 through 9 show block diagrams of a device that supports beam management for C-DRX operation in accordance with aspects of the present disclosure.

FIG. 7 shows a block diagram 700 of a wireless device 705 that supports beam management for C-DRX operation in accordance with aspects of the present disclosure. Wireless device 705 may be an example of aspects of a UE 115 as described with reference to FIG. 1. Wireless device 705 may include receiver 710, UE beam manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam management for C-DRX operation, etc.). Information may be passed on to other components of the device. The receiver 710 may be an example of aspects of the transceiver 1035 described with reference to FIG. 10. The receiver 710 may utilize a single antenna or a set of antennas.

UE beam manager 715 may be an example of aspects of the UE beam manager 1015 described with reference to FIG. 10. UE beam manager 715 and/or at least some of its various sub-components may be implemented in hardware, software executed by a processor, firmware, or any combination thereof. If implemented in software executed by a processor, the functions of the UE beam manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE beam manager 715 and/or at least some of its various sub-components may be physically located at various positions, including being distributed such that portions of functions are implemented at different physical locations by one or more physical devices. In some examples, UE beam manager 715 and/or at least some of its various sub-components may be a separate and distinct component in accordance with various aspects of the present disclosure. In other examples, UE beam manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE beam manager 715 may receive, at a UE, a UE-specific beam management configuration parameter from a base station, receive, while the UE is in a C-DRX OFF state, a reference signal from the base station during a time interval based on the UE-specific beam management configuration parameter, and selectively reconfigure, while the UE is in the C-DRX OFF state, an active beam between the base station and the UE based on the reference signal.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
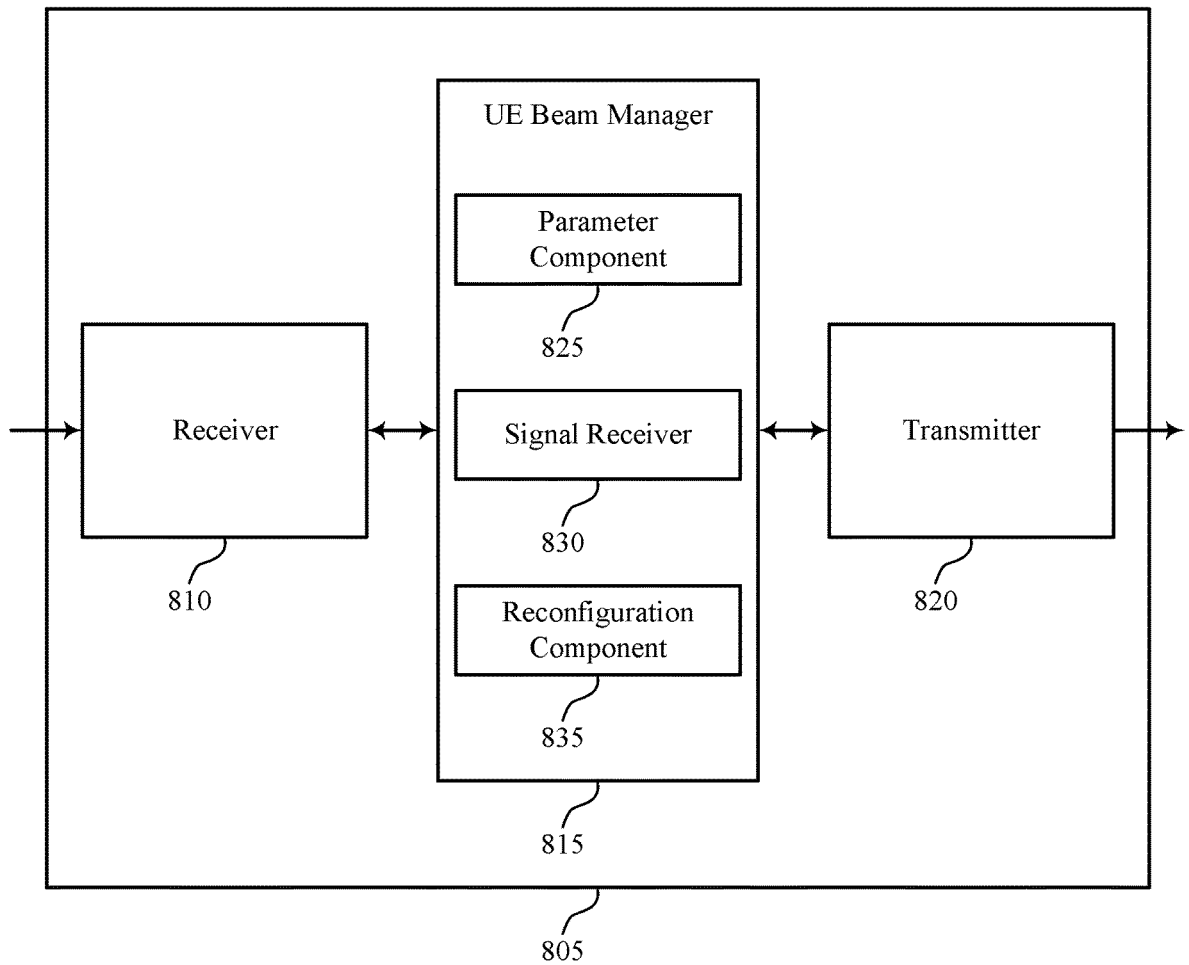

FIG. 8 shows a block diagram 800 of a wireless device 805 that supports beam management for C-DRX operation in accordance with aspects of the present disclosure. Wireless device 805 may be an example of aspects of a wireless device 705 or a UE 115 as described with reference to FIGS. 1 and 7. Wireless device 805 may include receiver 810, UE beam manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to beam management for C-DRX operation, etc.). Information may be passed on to other components of the device. The receiver 810 may be an example of aspects of the transceiver 1035 described with reference to FIG. 10. The receiver 810 may utilize a single antenna or a set of antennas.

UE beam manager 815 may be an example of aspects of the UE beam manager 1015 described with reference to FIG. 10. UE beam manager 815 may also include parameter component 825, signal receiver 830, and reconfiguration component 835. Parameter component 825 may receive, at a UE, a UE-specific beam management configuration parameter from a base station.

Signal receiver 830 may receive, while the UE is in a C-DRX OFF state, a reference signal from the base station during a time interval based on the UE-specific beam management configuration parameter. In some cases, signal receiver 830 may receive the first UE gap parameter from the base station, receive the second UE gap parameter from the base station, and receive the control information from the base station over the active beam. In some examples, the second UE gap parameter is based on a UE uplink/downlink transition capability.

Reconfiguration component 835 may selectively reconfigure, while the UE is in the C-DRX OFF state, an active beam between the base station and the UE based on the reference signal and selectively reconfigure the active beam is based on the determined quality of the active beam. In some cases, selectively reconfiguring the active beam includes: determining to reconfigure the active beam if the determined quality of the active beam fails to satisfy a quality threshold.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
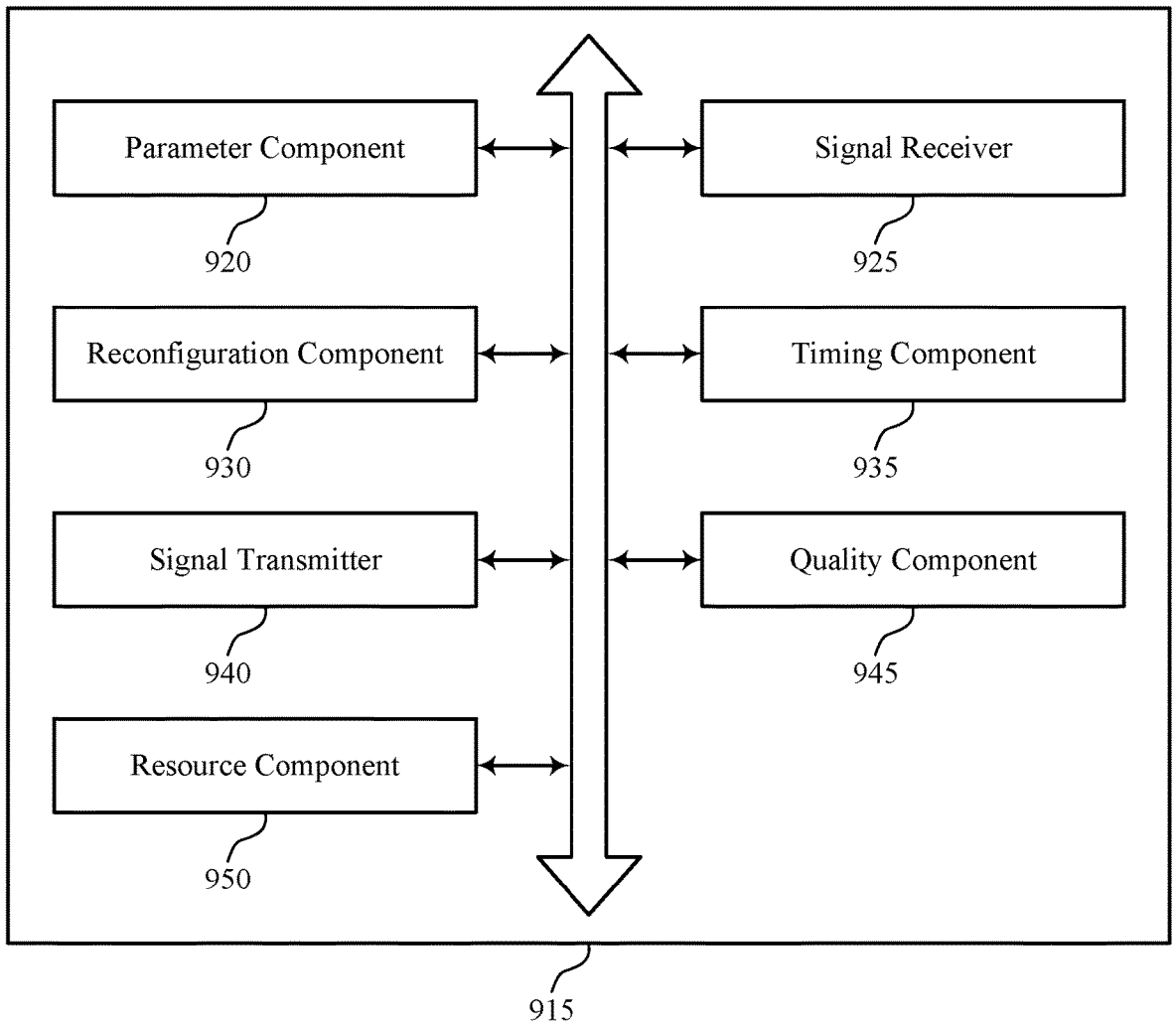

FIG. 9 shows a block diagram 900 of a UE beam manager 915 that supports beam management for C-DRX operation in accordance with aspects of the present disclosure. The UE beam manager 915 may be an example of aspects of a UE beam manager 715, a UE beam manager 815, or a UE beam manager 1015 described with reference to FIGS. 7, 8, and 10. The UE beam manager 915 may include parameter component 920, signal receiver 925, reconfiguration component 930, timing component 935, signal transmitter 940, quality component 945, and resource component 950. Each of these modules may communicate, directly or indirectly, with one another (e.g., via one or more buses).

Parameter component 920 may receive, at a UE, a UE-specific beam management configuration parameter from a base station.

Signal receiver 925 may receive, while the UE is in a C-DRX OFF state, a reference signal from the base station during a time interval based on the UE-specific beam management configuration parameter. In some examples, signal receiver 925 may receive the first UE gap parameter from the base station, receive the second UE gap parameter from the base station, and receive the control information from the base station over the active beam. In some cases, the second UE gap parameter is based on a UE uplink/downlink transition capability.

Reconfiguration component 930 may selectively reconfigure, while the UE is in the C-DRX OFF state, an active beam between the base station and the UE based on the reference signal and selectively reconfigure the active beam is based on the determined quality of the active beam. In some cases, selectively reconfiguring the active beam includes: determining to reconfigure the active beam if the determined quality of the active beam fails to satisfy a quality threshold.

Timing component 935 may determine, based on the UE-specific beam management configuration parameter, the time interval for reception of the reference signal with respect to a scheduled beginning of a C-DRX ON state, determine a time to transmit the measurement report of the reference signal based on a first UE gap parameter, and determine a time to receive control information from the base station during the C-DRX OFF state based on a second UE gap parameter and a time of transmission of the measurement report. In some cases, the first UE gap parameter is based on a UE power-up capability.

Signal transmitter 940 may transmit, to the base station and while the UE is in the C-DRX OFF state, a selection of a new active beam based on selectively reconfiguring the active beam. In some examples, signal transmitter 940 may transmit, to the base station and while the UE is in the C-DRX OFF state, at least one of a UE reference signal or a request for an uplink grant based on the determined quality of the active beam, and transmit, to the base station and while the UE is in the C-DRX OFF state, a measurement report of the reference signal based on selectively reconfiguring the active beam.

Quality component 945 may determine a quality of the active beam between the UE and the base station based on the reference signal. Resource component 950 may determine a set of uplink resources for transmitting the measurement report based on a set of downlink resources used to receive the reference signal.

Figure 10:
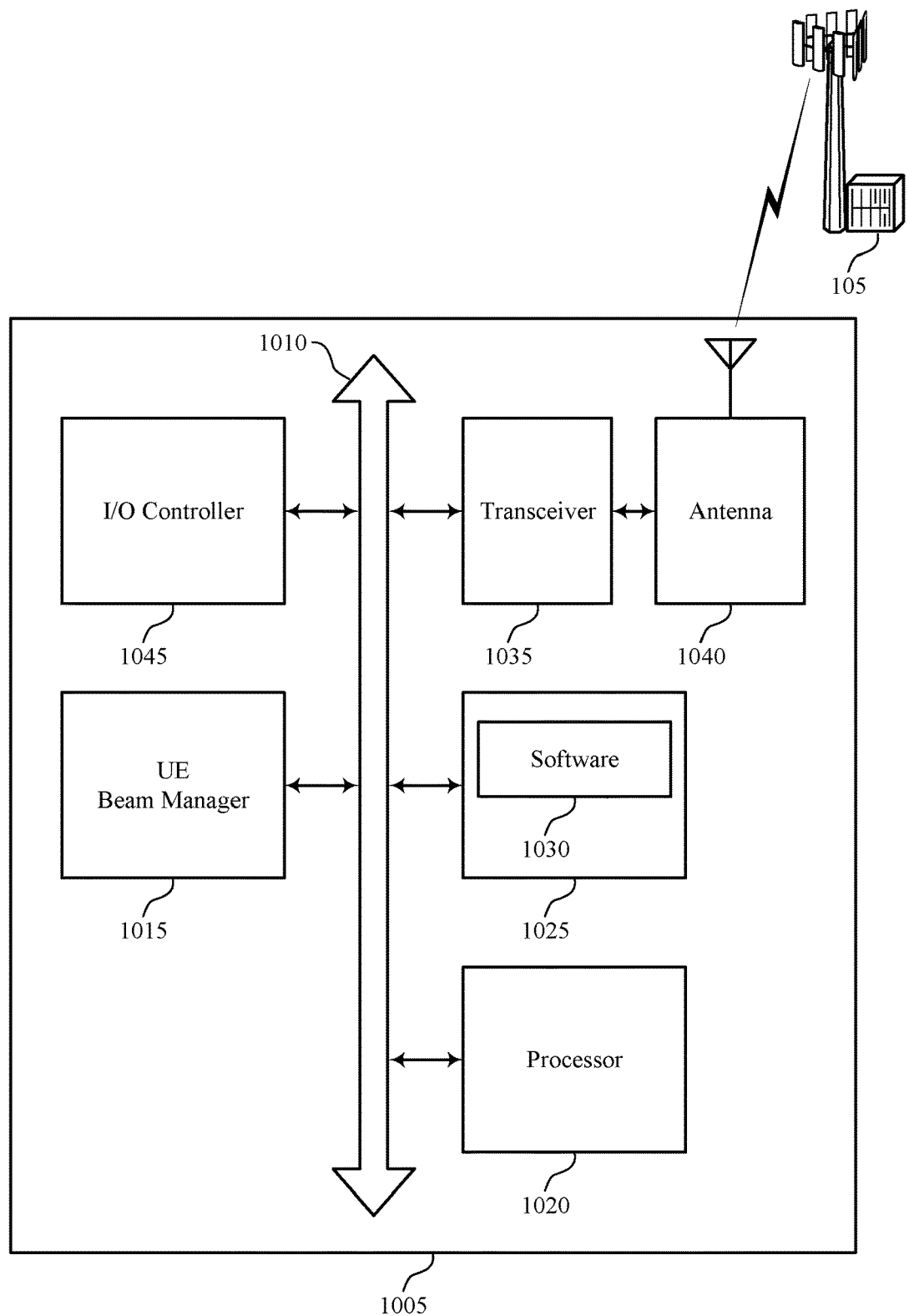
FIG. 10 illustrates a block diagram of a system including a UE that supports beam management for C-DRX operation in accordance with aspects of the present disclosure.

FIG. 10 shows a diagram of a system 1000 including a device 1005 that supports beam management for C-DRX operation in accordance with aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE beam manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting beam management for C-DRX operation).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support beam management for C-DRX operation. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
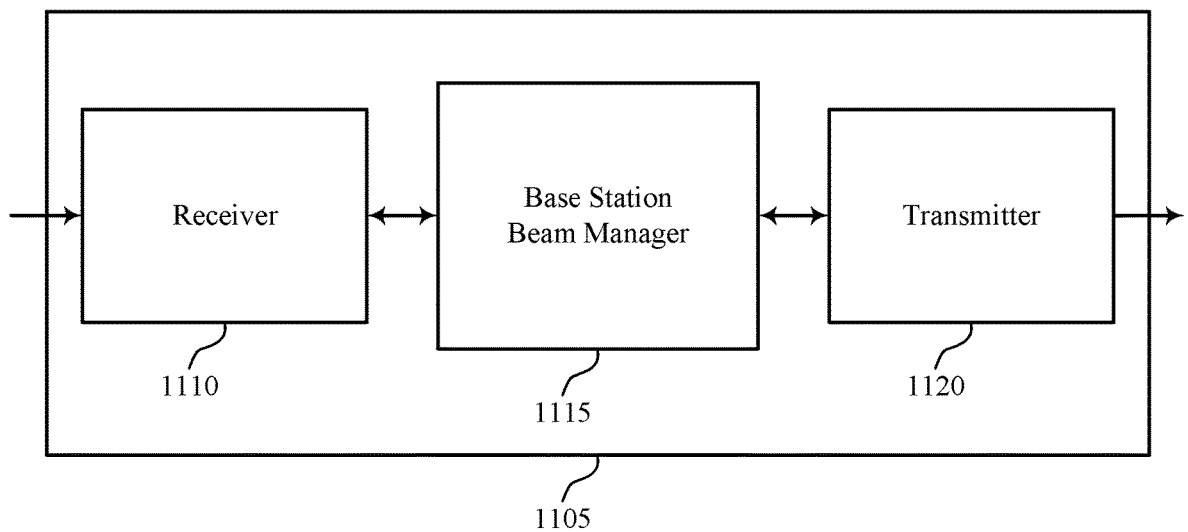
FIGS. 11 through 13 show block diagrams of a device that supports beam management for C-DRX operation in accordance with aspects of the present disclosure.

FIG. 11 shows a block diagram 1100 of a wireless device 1105 that supports beam management for C-DRX operation in accordance with aspects of the present disclosure. Wireless device 1105 may be an example of aspects of a base station 105 as described with reference to FIG. 1. Wireless device 1105 may include receiver 1110, base station beam manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam management for C-DRX operation, etc.). Information may be passed on to other components of the device. The receiver 1110 may be an example of aspects of the transceiver 1435 described with reference to FIG. 14. The receiver 1110 may utilize a single antenna or a set of antennas.

Base station beam manager 1115 may be an example of aspects of the base station beam manager 1415 described with reference to FIG. 14. Base station beam manager 1115 and/or at least some of its various sub-components may be implemented in hardware, software executed by a processor, firmware, or any combination thereof. If implemented in software executed by a processor, the functions of the base station beam manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station beam manager 1115 and/or at least some of its various sub-components may be physically located at various positions, including being distributed such that portions of functions are implemented at different physical locations by one or more physical devices. In some examples, base station beam manager 1115 and/or at least some of its various sub-components may be a separate and distinct component in accordance with various aspects of the present disclosure. In other examples, base station beam manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station beam manager 1115 may transmit, to the UE, a UE-specific beam management configuration parameter indicating a time interval for reception of a reference signal, transmit the reference signal to the UE while the UE is in a C-DRX OFF state, and selectively reconfigure, while the UE is in the C-DRX OFF state, the active beam based on a response to the reference signal from the UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
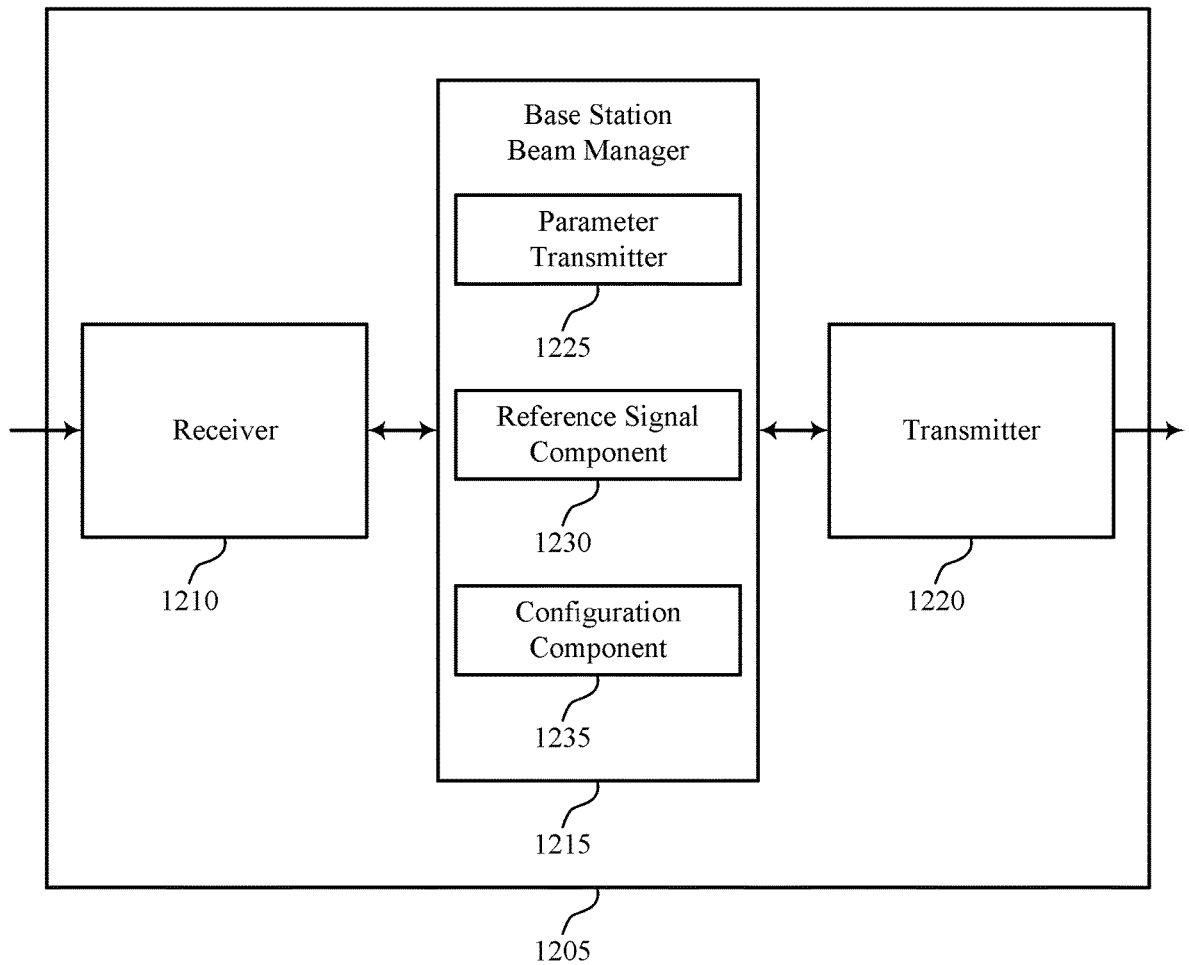

FIG. 12 shows a block diagram 1200 of a wireless device 1205 that supports beam management for C-DRX operation in accordance with aspects of the present disclosure. Wireless device 1205 may be an example of aspects of a wireless device 1105 or a base station 105 as described with reference to FIGS. 1 and 11. Wireless device 1205 may include receiver 1210, base station beam manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to beam management for C-DRX operation, etc.). Information may be passed on to other components of the device. The receiver 1210 may be an example of aspects of the transceiver 1435 described with reference to FIG. 14. The receiver 1210 may utilize a single antenna or a set of antennas.

Base station beam manager 1215 may be an example of aspects of the base station beam manager 1415 described with reference to FIG. 14. Base station beam manager 1215 may also include parameter transmitter 1225, reference signal component 1230, and configuration component 1235.

Parameter transmitter 1225 may transmit, to the UE, a UE-specific beam management configuration parameter indicating a time interval for reception of a reference signal and transmit, to the UE, at least one of a first UE gap parameter and a second UE gap parameter.

Reference signal component 1230 may transmit the reference signal to the UE while the UE is in a C-DRX OFF state.

Configuration component 1235 may selectively reconfigure, while the UE is in the C-DRX OFF state, the active beam based on a response to the reference signal from the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
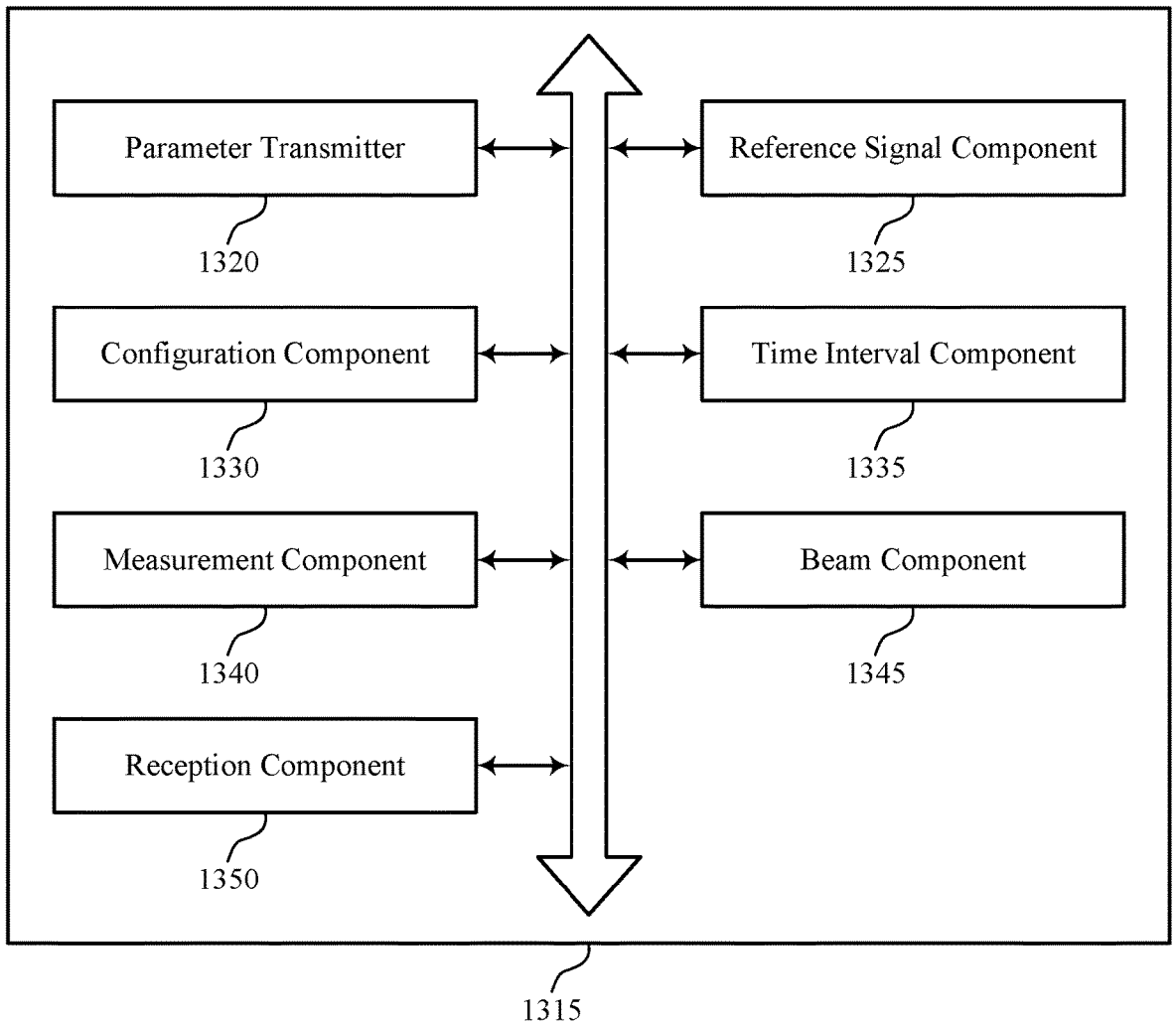

FIG. 13 shows a block diagram 1300 of a base station beam manager 1315 that supports beam management for C-DRX operation in accordance with aspects of the present disclosure. The base station beam manager 1315 may be an example of aspects of a base station beam manager 1415 described with reference to FIGS. 11, 12, and 14. The base station beam manager 1315 may include parameter transmitter 1320, reference signal component 1325, configuration component 1330, time interval component 1335, measurement component 1340, beam component 1345, and reception component 1350. Each of these modules may communicate, directly or indirectly, with one another (e.g., via one or more buses).

Parameter transmitter 1320 may transmit, to the UE, a UE-specific beam management configuration parameter indicating a time interval for reception of a reference signal and transmit, to the UE, at least one of a first UE gap parameter and a second UE gap parameter.

Reference signal component 1325 may transmit the reference signal to the UE while the UE is in a C-DRX OFF state.

Configuration component 1330 may selectively reconfigure, while the UE is in the C-DRX OFF state, the active beam based on a response to the reference signal from the UE.

Time interval component 1335 may determine the time interval for reception of the reference signal with respect to a scheduled beginning of a C-DRX ON state for the UE.

Measurement component 1340 may receive, from the UE and while the UE is in the C-DRX OFF state, a measurement report of the reference signal.

Beam component 1345 may establish an active beam for communication with a UE.

Reception component 1350 may receive, from the UE, an indication of capabilities of the UE, where transmitting at least one of the first gap parameter and the second gap parameter is based on the capabilities of the U. In some examples, reception component 1350 may receive, from the UE and while the UE is in the C-DRX OFF state, a selection of a new active beam, where selectively reconfiguring the active beam is based on the selection of the new active beam, and receive, from the UE and while the UE is in the C-DRX OFF state, at least one of a UE reference signal or a request for an uplink grant based on the reference signal.

Figure 14:
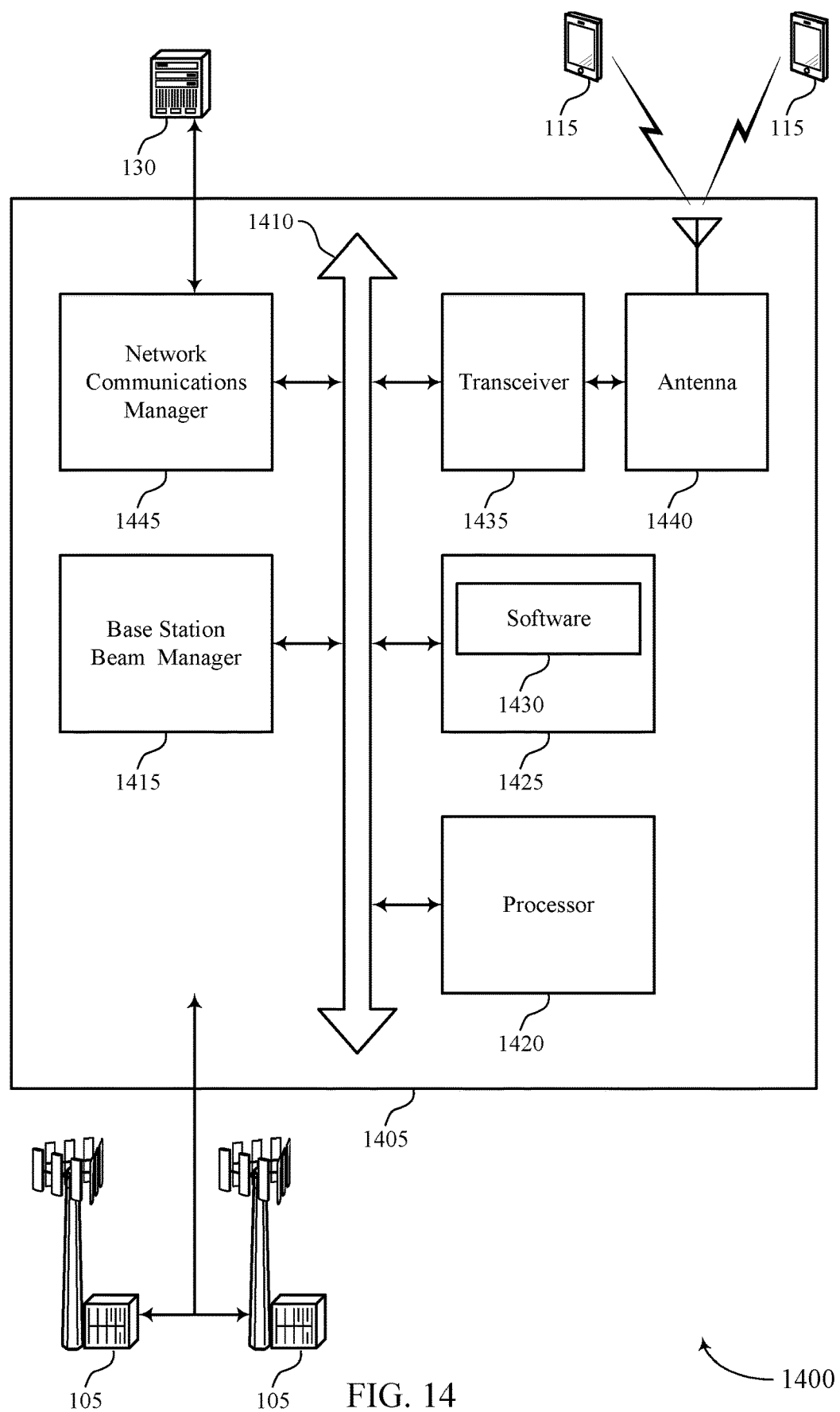
FIG. 14 illustrates a block diagram of a system including a base station that supports beam management for C-DRX operation in accordance with aspects of the present disclosure.

FIG. 14 shows a diagram of a system 1400 including a device 1405 that supports beam management for C-DRX operation in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station beam manager 1415, processor 1420, memory 1425, software 1430, transceiver 1435, antenna 1440, network communications manager 1445, and inter-station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting beam management for C-DRX operation).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support beam management for C-DRX operation. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
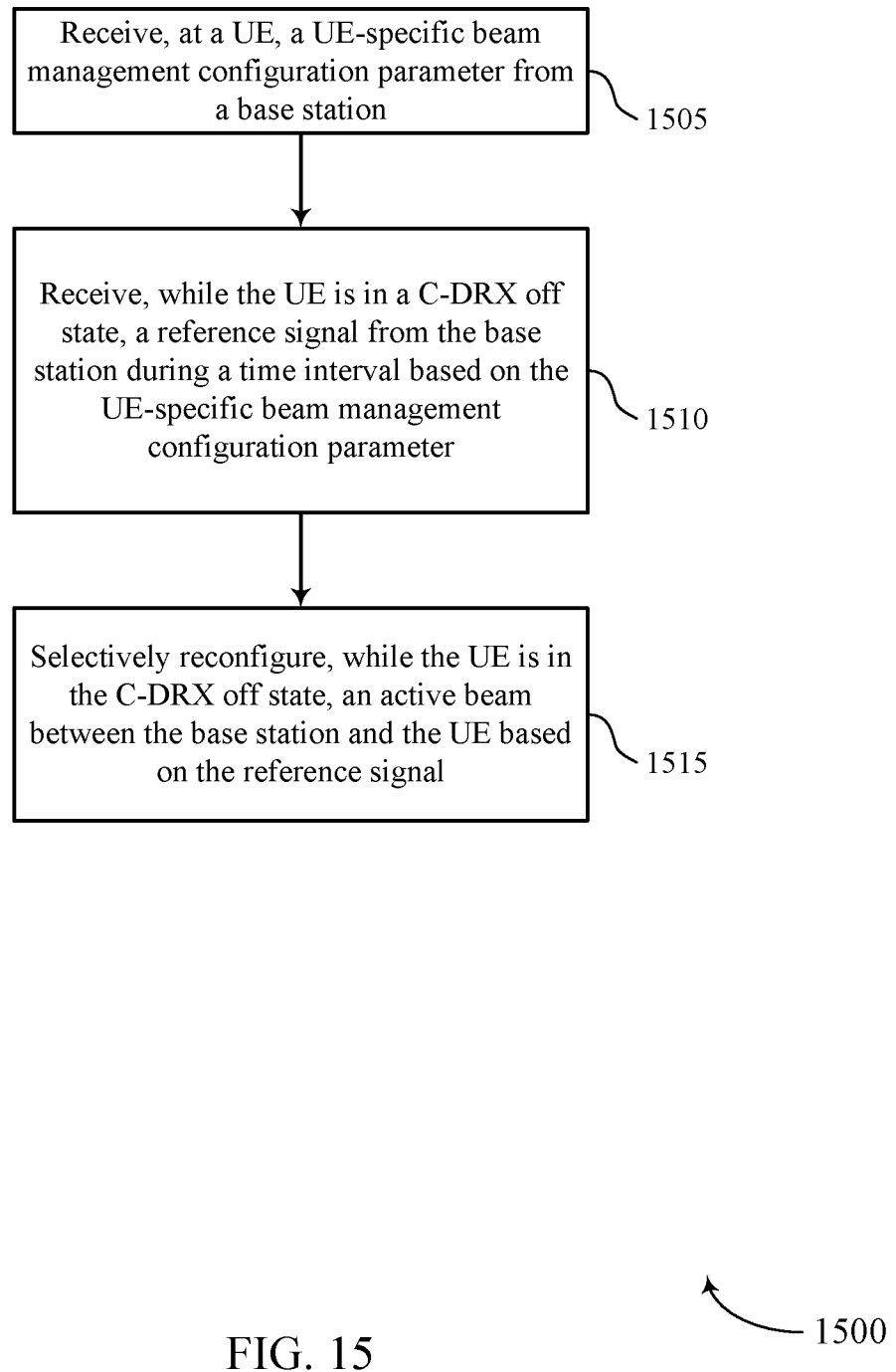
FIGS. 15 through 16 illustrate methods for beam management for C-DRX operation in accordance with aspects of the present disclosure.

FIG. 15 shows a flowchart illustrating a method 1500 for beam management for C-DRX operation in accordance with aspects of the present disclosure. The operations of method 1500 may be implemented by a UE 115 or its components as described herein. For example, the operations of method 1500 may be performed by a UE beam manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, at a UE, a UE-specific beam management configuration parameter from a base station. The operations of block 1505 may be performed according to the methods described with reference to FIGS. 1 through 6. In certain examples, aspects of the operations of block 1505 may be performed by a parameter component as described with reference to FIGS. 7 through 10.

At block 1510 the UE 115 may receive, while the UE is in a C-DRX OFF state, a reference signal from the base station during a time interval based at least in part on the UE-specific beam management configuration parameter. The operations of block 1510 may be performed according to the methods described with reference to FIGS. 1 through 6. In certain examples, aspects of the operations of block 1510 may be performed by a signal receiver as described with reference to FIGS. 7 through 10.

At block 1515 the UE 115 may selectively reconfigure, while the UE is in the C-DRX OFF state, an active beam between the base station and the UE based at least in part on the reference signal. The operations of block 1515 may be performed according to the methods described with reference to FIGS. 1 through 6. In certain examples, aspects of the operations of block 1515 may be performed by a reconfiguration component as described with reference to FIGS. 7 through 10.

Figure 16:
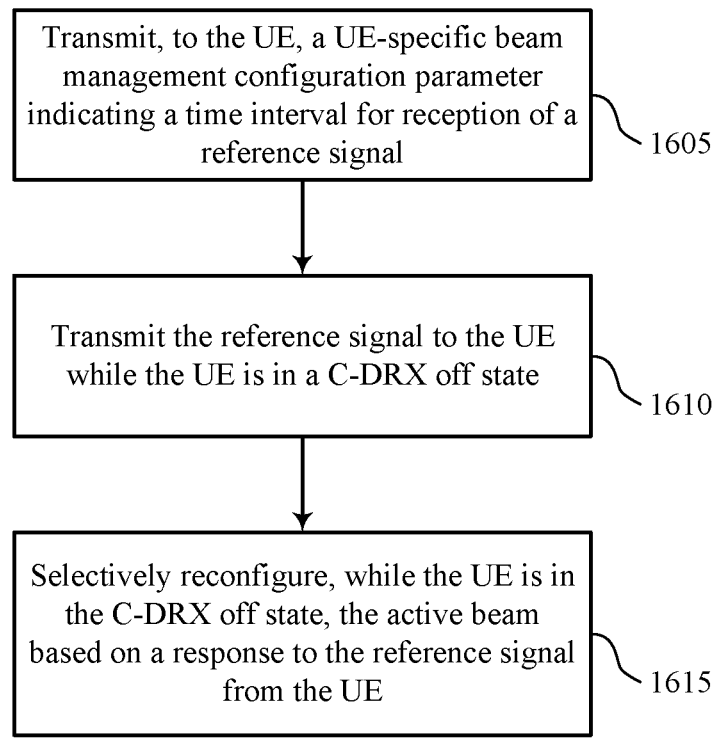

FIG. 16 shows a flowchart illustrating a method 1600 for beam management for C-DRX operation in accordance with aspects of the present disclosure. The operations of method 1600 may be implemented by a base station 105 or its components as described herein. For example, the operations of method 1600 may be performed by a base station beam manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit, to the UE, a UE-specific beam management configuration parameter indicating a time interval for reception of a reference signal. The operations of block 1605 may be performed according to the methods described with reference to FIGS. 1 through 6. In certain examples, aspects of the operations of block 1605 may be performed by a parameter transmitter as described with reference to FIGS. 11 through 14.

At block 1610 the base station 105 may transmit the reference signal to the UE while the UE is in a C-DRX OFF state. The operations of block 1610 may be performed according to the methods described with reference to FIGS. 1 through 6. In certain examples, aspects of the operations of block 1610 may be performed by a reference signal component as described with reference to FIGS. 11 through 14.

At block 1615 the base station 105 may selectively reconfigure, while the UE is in the C-DRX OFF state, the active beam based at least in part on a response to the reference signal from the UE. The operations of block 1615 may be performed according to the methods described with reference to FIGS. 1 through 6. In certain examples, aspects of the operations of block 1615 may be performed by a configuration component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a user equipment (UE), a UE-specific beam management configuration parameter from a base station;
receiving, while the UE is in a connected mode discontinuous reception (C-DRX) off state, a reference signal from the base station during a time interval based at least in part on the UE-specific beam management configuration parameter;
determining a quality of an active beam between the UE and the base station based at least in part on the reference signal;
selectively reconfiguring, while the UE is in the C-DRX off state, the active beam between the base station and the UE based at least in part on the determined quality of the active beam failing to satisfy a quality threshold;
determining a time to transmit a measurement report of the reference signal based at least in part on a first UE gap parameter; and
transmitting, to the base station and while the UE is in the C-DRX off state, the measurement report of the reference signal based at least in part on the first UE gap parameter.

2. The method of claim 1, further comprising:
determining, based at least in part on the UE-specific beam management configuration parameter, the time interval for reception of the reference signal with respect to a scheduled beginning of a C-DRX on state.

3. The method of claim 1, further comprising:
transmitting, to the base station and while the UE is in the C-DRX off state, a selection of a new active beam based at least in part on selectively reconfiguring the active beam.

4. The method of claim 1, further comprising:
transmitting, to the base station and while the UE is in the C-DRX off state, at least one of a UE reference signal or a request for an uplink grant based at least in part on the determined quality of the active beam.

5. The method of claim 1, further comprising:
receiving the first UE gap parameter from the base station.

6. The method of claim 1, wherein:
the first UE gap parameter is based at least in part on a UE power-up capability.

7. The method of claim 1, further comprising:
determining a set of uplink resources for transmitting the measurement report based at least in part on a set of downlink resources used to receive the reference signal.

8. The method of claim 1, further comprising:
determining a time to receive control information from the base station during the C-DRX off state based at least in part on a second UE gap parameter and a time of transmission of the measurement report.

9. The method of claim 8, further comprising:
receiving the second UE gap parameter from the base station.

10. The method of claim 9, wherein:
the second UE gap parameter is based at least in part on a UE uplink/downlink transition capability.

11. The method of claim 8, further comprising:
receiving the control information from the base station over the active beam.

12. A method for wireless communication, comprising:
transmitting, to a user equipment (UE), a UE-specific beam management configuration parameter indicating a time interval for reception of a reference signal;

transmitting, to the UE, a first UE gap parameter;
transmitting the reference signal to the UE while the UE is in a connected mode discontinuous reception (C-DRX) off state;
selectively reconfiguring, while the UE is in the C-DRX off state, an active beam based at least in part on a response to the reference signal from the UE and a quality of the active beam failing to satisfy a quality threshold; and
receiving, from the UE and while the UE is in the C-DRX off state, a measurement report of the reference signal based at least in part on the first UE gap parameter.

13. The method of claim 12, further comprising:
determining the time interval for reception of the reference signal with respect to a scheduled beginning of a C-DRX on state for the UE.

14. The method of claim 12, further comprising:
establishing the active beam for communication with the UE.

15. The method of claim 12, further comprising:
transmitting, to the UE, a second UE gap parameter.

16. The method of claim 15, further comprising:
receiving, from the UE, an indication of capabilities of the UE, wherein transmitting at least one of the first gap parameter and the second gap parameter is based at least in part on the capabilities of the UE.

17. The method of claim 12, further comprising:
receiving, from the UE and while the UE is in the C-DRX off state, a selection of a new active beam, wherein selectively reconfiguring the active beam is based at least in part on the selection of the new active beam.

18. The method of claim 12, further comprising:
receiving, from the UE and while the UE is in the C-DRX off state, at least one of a UE reference signal or a request for an uplink grant based at least in part on the reference signal.

19. An apparatus for wireless communication, comprising:
a processor;
memory in electronic communication with the processor; and
instructions stored in the memory and operable, when executed by the processor, to cause the apparatus to:
receive, at a user equipment (UE), a UE-specific beam management configuration parameter from a base station;
receive, while the UE is in a connected mode discontinuous reception (C-DRX) off state, a reference signal from the base station during a time interval based at least in part on the UE-specific beam management configuration parameter;
determine a quality of an active beam between the UE and the base station based at least in part on the reference signal;
selectively reconfigure, while the UE is in the C-DRX off state, the active beam between the base station and the UE based at least in part on the determined quality of the active beam failing to satisfy a quality threshold;
determine a time to transmit a measurement report of the reference signal based at least in part on a first UE gap parameter; and
transmit, to the base station and while the UE is in the C-DRX off state, the measurement report of the reference signal based at least in part on the first UE gap parameter.

20. The apparatus of claim 19, wherein the instructions are further executable by the processor to:
determine, based at least in part on the UE-specific beam management configuration parameter, the time interval for reception of the reference signal with respect to a scheduled beginning of a C-DRX on state.

21. The apparatus of claim 19, wherein the instructions are further executable by the processor to:
transmit, to the base station and while the UE is in the C-DRX off state, a selection of a new active beam based at least in part on selectively reconfiguring the active beam.

22. The apparatus of claim 19, wherein the instructions are further executable by the processor to:
transmit, to the base station and while the UE is in the C-DRX off state, at least one of a UE reference signal or a request for an uplink grant based at least in part on the determined quality of the active beam.

23. An apparatus for wireless communication, comprising:
a processor;
memory in electronic communication with the processor; and
instructions stored in the memory and operable, when executed by the processor, to cause the apparatus to:
transmit, to a user equipment (UE), a UE-specific beam management configuration parameter indicating a time interval for reception of a reference signal;
transmit, to the UE, a first UE gap parameter;
transmit the reference signal to the UE while the UE is in a connected mode discontinuous reception (C-DRX) off state;
selectively reconfigure, while the UE is in the C-DRX off state, an active beam based at least in part on a response to the reference signal from the UE and a quality of the active beam failing to satisfy a quality threshold; and
receive, from the UE and while the UE is in the C-DRX off state, a measurement report of the reference signal based at least in part on the first UE gap parameter.

24. The apparatus of claim 23, wherein the instructions are further executable by the processor to:
determine the time interval for reception of the reference signal with respect to a scheduled beginning of a C-DRX on state for the UE.

25. The apparatus of claim 23, wherein the instructions are further executable by the processor to:
transmit, to the UE, a second UE gap parameter.

* * * * *